(12) United States Patent
Coleman et al.

(10) Patent No.: US 12,141,118 B2
(45) Date of Patent: Nov. 12, 2024

(54) OPTIMIZING STORAGE SYSTEM PERFORMANCE USING DATA CHARACTERISTICS

(71) Applicant: PURE STORAGE, INC., Santa Clara, CA (US)

(72) Inventors: Gordon James Coleman, Los Altos, CA (US); Peter E. Kirkpatrick, Los Altos, CA (US); Eric D. Seppanen, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 18/327,606

(22) Filed: Jun. 1, 2023

(65) Prior Publication Data

US 2023/0306010 A1    Sep. 28, 2023

Related U.S. Application Data

(63) Continuation of application No. 16/891,201, filed on Jun. 3, 2020, now abandoned, which is a continuation
(Continued)

(51) Int. Cl.
*G06F 3/06* (2006.01)
*G06F 9/4401* (2018.01)
(Continued)

(52) U.S. Cl.
CPC ........ *G06F 16/2282* (2019.01); *G06F 3/0607* (2013.01); *G06F 3/061* (2013.01);
(Continued)

(58) Field of Classification Search
CPC ...... G06F 21/572; G06F 21/57; G06F 9/4401; G06F 9/4881; G06F 16/2282; G06F 16/211; G06F 16/252; G06F 3/0607; G06F 3/061; G06F 3/0613; G06F 3/0646; G06F 3/0619; G06F 3/0632; G06F 3/064; G06F 3/065;
(Continued)

(56) References Cited

U.S. PATENT DOCUMENTS

| | | | |
|---|---|---|---|
| 5,208,813 | A | 5/1993 | Stallmo |
| 5,390,327 | A | 2/1995 | Lubbers et al. |

(Continued)

FOREIGN PATENT DOCUMENTS

| | | | |
|---|---|---|---|
| EP | 2164006 A2 | 3/2010 | |
| EP | 2256621 A1 | 12/2010 | |

(Continued)

OTHER PUBLICATIONS

Hwang et al., "RAID-x: A New Distributed Disk Array for I/O-Centric Cluster Computing", Proceedings of the Ninth International Symposium on High-performance Distributed Computing, Aug. 2000, pp. 279-286, The Ninth International Symposium on High-Performance Distributed Computing, IEEE Computer Society, Los Alamitos, CA.

(Continued)

*Primary Examiner* — Tracy C Chan

(57) ABSTRACT

Characteristics associated with a device are received from the device. Firmware for the device is generated based on the received characteristics.

18 Claims, 14 Drawing Sheets

Related U.S. Application Data of application No. 15/419,747, filed on Jan. 30, 2017, now abandoned.

(60) Provisional application No. 62/403,881, filed on Oct. 4, 2016, provisional application No. 62/404,095, filed on Oct. 4, 2016, provisional application No. 62/403,894, filed on Oct. 4, 2016.

(51) Int. Cl.
    *G06F 9/48*           (2006.01)
    *G06F 12/02*         (2006.01)
    *G06F 16/21*         (2019.01)
    *G06F 16/22*         (2019.01)
    *G06F 16/25*         (2019.01)
    *G06F 21/57*         (2013.01)

(52) U.S. Cl.
    CPC .......... *G06F 3/0619* (2013.01); *G06F 3/0632* (2013.01); *G06F 3/064* (2013.01); *G06F 3/065* (2013.01); *G06F 3/0652* (2013.01); *G06F 3/0655* (2013.01); *G06F 3/0665* (2013.01); *G06F 3/0688* (2013.01); *G06F 3/0689* (2013.01); *G06F 9/4401* (2013.01); *G06F 9/4881* (2013.01); *G06F 12/0246* (2013.01); *G06F 12/0253* (2013.01); *G06F 16/211* (2019.01); *G06F 16/252* (2019.01); *G06F 21/572* (2013.01); *G06F 2209/482* (2013.01); *G06F 2212/702* (2013.01); *G06F 2212/7205* (2013.01)

(58) Field of Classification Search
    CPC .... G06F 3/0652; G06F 3/0655; G06F 3/0665; G06F 3/0688; G06F 3/0689; G06F 12/0246; G06F 12/0253; G06F 2212/702; G06F 2212/705; G06F 2212/7205; G06F 2209/482
See application file for complete search history.

(56) References Cited

U.S. PATENT DOCUMENTS

| | | |
|---|---|---|
| 5,450,581 A | 9/1995 | Bergen et al. |
| 5,479,653 A | 12/1995 | Jones |
| 5,488,731 A | 1/1996 | Mendelsohn |
| 5,504,858 A | 4/1996 | Ellis et al. |
| 5,564,113 A | 10/1996 | Bergen et al. |
| 5,574,882 A | 11/1996 | Menon et al. |
| 5,649,093 A | 7/1997 | Hanko et al. |
| 5,883,909 A | 3/1999 | DeKoning et al. |
| 6,000,010 A | 12/1999 | Legg |
| 6,260,156 B1 | 7/2001 | Garvin et al. |
| 6,269,453 B1 | 7/2001 | Krantz |
| 6,275,898 B1 | 8/2001 | DeKoning |
| 6,453,428 B1 | 9/2002 | Stephenson |
| 6,523,087 B2 | 2/2003 | Busser |
| 6,535,417 B2 | 3/2003 | Tsuda et al. |
| 6,643,748 B1 | 11/2003 | Wieland |
| 6,725,392 B1 | 4/2004 | Frey et al. |
| 6,763,455 B2 | 7/2004 | Hall |
| 6,836,816 B2 | 12/2004 | Kendall |
| 6,985,995 B2 | 1/2006 | Holland et al. |
| 7,032,125 B2 | 4/2006 | Holt et al. |
| 7,047,358 B2 | 5/2006 | Lee et al. |
| 7,051,155 B2 | 5/2006 | Talagala et al. |
| 7,055,058 B2 | 5/2006 | Lee et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,188,270 B1 | 3/2007 | Nanda et al. |
| 7,334,156 B2 | 2/2008 | Land et al. |
| 7,370,220 B1 | 5/2008 | Nguyen et al. |
| 7,386,666 B1 | 6/2008 | Beauchamp et al. |
| 7,398,285 B2 | 7/2008 | Kisley |
| 7,424,498 B1 | 9/2008 | Patterson |
| 7,424,592 B1 | 9/2008 | Karr et al. |
| 7,444,532 B2 | 10/2008 | Masuyama et al. |
| 7,480,658 B2 | 1/2009 | Heinla et al. |
| 7,484,056 B2 | 1/2009 | Madnani et al. |
| 7,484,057 B1 | 1/2009 | Madnani et al. |
| 7,484,059 B1 | 1/2009 | Ofer et al. |
| 7,536,506 B2 | 5/2009 | Ashmore et al. |
| 7,558,859 B2 | 7/2009 | Kasiolas et al. |
| 7,565,446 B2 | 7/2009 | Talagala et al. |
| 7,613,947 B1 | 11/2009 | Coatney et al. |
| 7,634,617 B2 | 12/2009 | Misra |
| 7,634,618 B2 | 12/2009 | Misra |
| 7,681,104 B1 | 3/2010 | Sim-Tang et al. |
| 7,681,105 B1 | 3/2010 | Sim-Tang et al. |
| 7,681,109 B2 | 3/2010 | Litsyn et al. |
| 7,730,257 B2 | 6/2010 | Franklin |
| 7,730,258 B1 | 6/2010 | Smith et al. |
| 7,730,274 B1 | 6/2010 | Usgaonkar |
| 7,743,276 B2 | 6/2010 | Jacobson et al. |
| 7,752,489 B2 | 7/2010 | Deenadhayalan et al. |
| 7,757,038 B2 | 7/2010 | Kitahara |
| 7,757,059 B1 | 7/2010 | Ofer et al. |
| 7,778,960 B1 | 8/2010 | Chatterjee et al. |
| 7,783,955 B2 | 8/2010 | Murin |
| 7,814,272 B2 | 10/2010 | Barrall et al. |
| 7,814,273 B2 | 10/2010 | Barrall |
| 7,818,531 B2 | 10/2010 | Barrall |
| 7,827,351 B2 | 11/2010 | Suetsugu et al. |
| 7,827,439 B2 | 11/2010 | Mathew et al. |
| 7,831,768 B2 | 11/2010 | Ananthamurthy et al. |
| 7,856,583 B1 | 12/2010 | Smith |
| 7,870,105 B2 | 1/2011 | Arakawa et al. |
| 7,873,878 B2 | 1/2011 | Belluomini et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,921,268 B2 | 4/2011 | Jakob |
| 7,930,499 B2 | 4/2011 | Duchesne |
| 7,941,697 B2 | 5/2011 | Mathew et al. |
| 7,958,303 B2 | 6/2011 | Shuster |
| 7,971,129 B2 | 6/2011 | Watson et al. |
| 7,975,115 B2 | 7/2011 | Wayda et al. |
| 7,984,016 B2 | 7/2011 | Kisley |
| 7,991,822 B2 | 8/2011 | Bish et al. |
| 8,006,126 B2 | 8/2011 | Deenadhayalan et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,074,038 B2 | 12/2011 | Lionetti et al. |
| 8,082,393 B2 | 12/2011 | Galloway et al. |
| 8,086,603 B2 | 12/2011 | Nasre et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 2/2012 | Jernigan, IV |
| 8,117,521 B2 | 2/2012 | Parker et al. |
| 8,140,821 B1 | 3/2012 | Raizen et al. |
| 8,145,838 B1 | 3/2012 | Miller et al. |
| 8,145,840 B2 | 3/2012 | Koul et al. |
| 8,175,012 B2 | 5/2012 | Chu et al. |
| 8,176,360 B2 | 5/2012 | Frost et al. |
| 8,176,405 B2 | 5/2012 | Hafner et al. |
| 8,180,855 B2 | 5/2012 | Aiello et al. |
| 8,200,922 B2 | 6/2012 | McKean et al. |
| 8,209,469 B2 | 6/2012 | Carpenter et al. |
| 8,225,006 B1 | 7/2012 | Karamcheti |
| 8,239,618 B2 | 8/2012 | Kotzur et al. |

(56) References Cited

U.S. PATENT DOCUMENTS

| | | |
|---|---|---|
| 8,244,999 B1 | 8/2012 | Chatterjee et al. |
| 8,261,016 B1 | 9/2012 | Goel |
| 8,271,455 B2 | 9/2012 | Kesselman |
| 8,285,686 B2 | 10/2012 | Kesselman |
| 8,305,811 B2 | 11/2012 | Jeon |
| 8,315,999 B2 | 11/2012 | Chatley et al. |
| 8,327,080 B1 | 12/2012 | Der |
| 8,335,769 B2 | 12/2012 | Kesselman |
| 8,341,118 B2 | 12/2012 | Drobychev et al. |
| 8,351,290 B1 | 1/2013 | Huang et al. |
| 8,364,920 B1 | 1/2013 | Parkison et al. |
| 8,365,041 B2 | 1/2013 | Olbrich et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Fillingim et al. |
| 8,452,928 B1 | 5/2013 | Ofer et al. |
| 8,473,698 B2 | 6/2013 | Lionetti et al. |
| 8,473,778 B2 | 6/2013 | Simitci et al. |
| 8,473,815 B2 | 6/2013 | Chung et al. |
| 8,479,037 B1 | 7/2013 | Chatterjee et al. |
| 8,484,414 B2 | 7/2013 | Sugimoto et al. |
| 8,498,967 B1 | 7/2013 | Chatterjee et al. |
| 8,504,797 B2 | 8/2013 | Mimatsu |
| 8,522,073 B2 | 8/2013 | Cohen |
| 8,527,544 B1 | 9/2013 | Colgrove et al. |
| 8,533,408 B1 | 9/2013 | Madnani et al. |
| 8,533,527 B2 | 9/2013 | Daikokuya et al. |
| 8,539,177 B1 | 9/2013 | Madnani et al. |
| 8,544,029 B2 | 9/2013 | Bakke et al. |
| 8,549,224 B1 | 10/2013 | Zeryck et al. |
| 8,583,861 B1 | 11/2013 | Ofer et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark et al. |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |
| 8,671,072 B1 | 3/2014 | Shah et al. |
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey, Jr. et al. |
| 8,719,621 B1 | 5/2014 | Karmarkar |
| 8,725,730 B2 | 5/2014 | Keeton et al. |
| 8,751,859 B2 | 6/2014 | Becker-Szendy et al. |
| 8,756,387 B2 | 6/2014 | Frost et al. |
| 8,762,793 B2 | 6/2014 | Grube et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,822,155 B2 | 9/2014 | Sukumar et al. |
| 8,824,261 B1 | 9/2014 | Miller et al. |
| 8,832,528 B2 | 9/2014 | Thatcher et al. |
| 8,838,541 B2 | 9/2014 | Camble et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes et al. |
| 8,874,836 B1 | 10/2014 | Hayes et al. |
| 8,880,793 B2 | 11/2014 | Nagineni |
| 8,880,825 B2 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bembo et al. |
| 9,021,215 B2 | 4/2015 | Meir et al. |
| 9,025,393 B2 | 5/2015 | Wu et al. |
| 9,043,372 B2 | 5/2015 | Makkar et al. |
| 9,047,214 B1 | 6/2015 | Northcott |
| 9,053,808 B2 | 6/2015 | Sprouse et al. |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon et al. |
| 9,122,401 B2 | 9/2015 | Zaltsman et al. |
| 9,123,422 B2 | 9/2015 | Yu et al. |
| 9,124,300 B2 | 9/2015 | Sharon et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma et al. |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman |
| 9,280,678 B2 | 3/2016 | Redberg |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Sharon et al. |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,395,922 B2 | 7/2016 | Nishikido et al. |
| 9,396,202 B1 | 7/2016 | Drobychev et al. |
| 9,400,828 B2 | 7/2016 | Kesselman et al. |

(56) References Cited

U.S. PATENT DOCUMENTS

| | | | |
|---|---|---|---|
| 9,405,478 B2 | 8/2016 | Koseki et al. |
| 9,411,685 B2 | 8/2016 | Lee |
| 9,417,960 B2 | 8/2016 | Cai et al. |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Hayes et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,542,118 B1 * | 1/2017 | Lercari ............... G06F 12/0246 |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Haratsch et al. |
| 9,619,430 B2 | 4/2017 | Kannan et al. |
| 9,645,754 B2 | 5/2017 | Li et al. |
| 9,667,720 B1 | 5/2017 | Bent et al. |
| 9,710,377 B1 | 7/2017 | Kuzmin et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |
| 9,811,285 B1 | 11/2017 | Karamcheti et al. |
| 9,811,546 B1 | 11/2017 | Bent et al. |
| 9,818,478 B2 | 11/2017 | Chung |
| 9,829,066 B2 | 11/2017 | Thomas et al. |
| 9,836,245 B2 | 12/2017 | Hayes et al. |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,952,809 B2 | 4/2018 | Shah |
| 9,959,167 B1 | 5/2018 | Donlan et al. |
| 9,965,539 B2 | 5/2018 | D'Halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Yang et al. |
| 10,019,317 B2 | 7/2018 | Usvyatsky et al. |
| 10,031,703 B1 | 7/2018 | Natanzon et al. |
| 10,061,512 B2 | 8/2018 | Lin |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Yang |
| 10,089,176 B1 | 10/2018 | Donlan et al. |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Yang et al. |
| 10,162,704 B1 | 12/2018 | Kirschner et al. |
| 10,180,875 B2 | 1/2019 | Klein |
| 10,185,730 B2 | 1/2019 | Bestler et al. |
| 10,235,065 B1 | 3/2019 | Miller et al. |
| 10,324,639 B2 | 6/2019 | Seo |
| 10,445,229 B1 * | 10/2019 | Kuzmin ................. G06F 12/10 |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0256141 A1 | 10/2008 | Wayda et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2010/0306500 A1 | 12/2010 | Mimatsu |
| 2011/0035540 A1 | 2/2011 | Fitzgerald et al. |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Yamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt et al. |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight et al. |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats et al. |
| 2013/0060884 A1 | 3/2013 | Bernbo et al. |
| 2013/0067188 A1 | 3/2013 | Mehra et al. |

(56) References Cited

U.S. PATENT DOCUMENTS

| | | |
|---|---|---|
| 2013/0073894 A1 | 3/2013 | Xavier et al. |
| 2013/0097380 A1* | 4/2013 | Colgrove ............... G06F 3/0608 711/E12.017 |
| 2013/0124776 A1 | 5/2013 | Hallak et al. |
| 2013/0132800 A1 | 5/2013 | Healey, Jr. et al. |
| 2013/0151653 A1 | 6/2013 | Sawicki et al. |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0339314 A1 | 12/2013 | Carpentier et al. |
| 2013/0339635 A1 | 12/2013 | Amit et al. |
| 2013/0339818 A1 | 12/2013 | Baker et al. |
| 2014/0040535 A1 | 2/2014 | Lee et al. |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075115 A1* | 3/2014 | Colgrove ............... G06F 3/0688 711/114 |
| 2014/0075252 A1 | 3/2014 | Luo et al. |
| 2014/0122510 A1 | 5/2014 | Namkoong et al. |
| 2014/0136880 A1 | 5/2014 | Shankar et al. |
| 2014/0181402 A1 | 6/2014 | White |
| 2014/0220561 A1 | 8/2014 | Sukumar et al. |
| 2014/0237164 A1 | 8/2014 | Le et al. |
| 2014/0279936 A1 | 9/2014 | Bembo et al. |
| 2014/0280025 A1 | 9/2014 | Eidson et al. |
| 2014/0289588 A1 | 9/2014 | Nagadomi et al. |
| 2014/0330785 A1 | 11/2014 | Isherwood et al. |
| 2014/0337560 A1 | 11/2014 | Chun et al. |
| 2014/0372838 A1 | 12/2014 | Lou et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik et al. |
| 2015/0134824 A1 | 5/2015 | Mickens et al. |
| 2015/0153800 A1 | 6/2015 | Lucas et al. |
| 2015/0154418 A1 | 6/2015 | Redberg |
| 2015/0180714 A1 | 6/2015 | Chunn et al. |
| 2015/0268864 A1* | 9/2015 | Bernat .................. G06F 3/0683 711/162 |
| 2015/0280959 A1 | 10/2015 | Vincent |
| 2016/0026397 A1 | 1/2016 | Nishikido et al. |
| 2016/0034190 A1 | 2/2016 | Lin et al. |
| 2016/0182542 A1 | 6/2016 | Staniford |
| 2016/0191508 A1 | 6/2016 | Bestler et al. |
| 2016/0246537 A1 | 8/2016 | Kim |
| 2016/0248631 A1 | 8/2016 | Duchesneau |
| 2016/0259586 A1* | 9/2016 | Tylik .................... G06F 3/0604 |
| 2016/0357471 A1 | 12/2016 | Zevulun et al. |
| 2016/0378356 A1 | 12/2016 | Colgrove et al. |
| 2016/0378612 A1 | 12/2016 | Hipsh et al. |
| 2017/0010815 A1 | 1/2017 | Sprouse et al. |
| 2017/0091236 A1 | 3/2017 | Hayes et al. |
| 2017/0103092 A1 | 4/2017 | Hu et al. |
| 2017/0103094 A1 | 4/2017 | Hu et al. |
| 2017/0103098 A1 | 4/2017 | Hu et al. |
| 2017/0103116 A1 | 4/2017 | Hu et al. |
| 2017/0123718 A1 | 5/2017 | Sinha et al. |
| 2017/0177236 A1 | 6/2017 | Haratsch et al. |
| 2017/0262202 A1 | 9/2017 | Seo |
| 2017/0344284 A1* | 11/2017 | Choi .................... G06F 3/0688 |
| 2018/0039442 A1 | 2/2018 | Shadrin et al. |
| 2018/0054454 A1 | 2/2018 | Astigarraga et al. |
| 2018/0081958 A1 | 3/2018 | Akirav et al. |
| 2018/0101441 A1 | 4/2018 | Hyun et al. |
| 2018/0101587 A1 | 4/2018 | Anglin et al. |
| 2018/0101588 A1 | 4/2018 | Anglin et al. |
| 2018/0217756 A1 | 8/2018 | Liu et al. |
| 2018/0307560 A1 | 10/2018 | Vishnumolakala et al. |
| 2018/0321874 A1 | 11/2018 | Li et al. |
| 2019/0036703 A1 | 1/2019 | Bestler |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0182189 A1* | 6/2021 | Duan .................. G06F 12/1009 |
| 2021/0360833 A1 | 11/2021 | Alissa et al. |

FOREIGN PATENT DOCUMENTS

| | | |
|---|---|---|
| WO | 0213033 A1 | 2/2002 |
| WO | 2008103569 A1 | 8/2008 |
| WO | 2008157081 A2 | 12/2008 |
| WO | 2013032825 A2 | 3/2013 |

OTHER PUBLICATIONS

International Search Report and Written Opinion, PCT/US2015/018169, May 15, 2015, 10 pages.

International Search Report and Written Opinion, PCT/US2015/034291, Sep. 30, 2015, 3 pages.

International Search Report and Written Opinion, PCT/US2015/034302, Sep. 11, 2015, 10 pages.

International Search Report and Written Opinion, PCT/US2015/039135, Sep. 18, 2015, 8 pages.

International Search Report and Written Opinion, PCT/US2015/039136, Sep. 23, 2015, 7 pages.

International Search Report and Written Opinion, PCT/US2015/039137, Oct. 1, 2015, 8 pages.

International Search Report and Written Opinion, PCT/US2015/039142, Sep. 24, 2015, 3 pages.

International Search Report and Written Opinion, PCT/US2015/044370, Dec. 15, 2015, 3 pages.

International Search Report and Written Opinion, PCT/US2016/014356, Jun. 28, 2016, 3 pages.

International Search Report and Written Opinion, PCT/US2016/014357, Jun. 29, 2016, 3 pages.

International Search Report and Written Opinion, PCT/US2016/014361, May 30, 2016, 3 pages.

International Search Report and Written Opinion, PCT/US2016/014604, May 19, 2016, 3 pages.

International Search Report and Written Opinion, PCT/US2016/016504, Jul. 6, 2016, 7 pages.

International Search Report and Written Opinion, PCT/US2016/023485, Jul. 21, 2016, 13 pages.

International Search Report and Written Opinion, PCT/US2016/024391, Jul. 12, 2016, 11 pages.

International Search Report and Written Opinion, PCT/US2016/026529, Jul. 19, 2016, 9 pages.

International Search Report and Written Opinion, PCT/US2016/031039, Aug. 18, 2016, 7 pages.

International Search Report and Written Opinion, PCT/US2016/033306, Aug. 19, 2016, 11 pages.

International Search Report and Written Opinion, PCT/US2016/047808, Nov. 25, 2016, 14 pages.

Kim et al., "Data Access Frequency based Data Replication Method using Erasure Codes in Cloud Storage System", Journal of the Institute of Electronics and Information Engineers, Feb. 2014, vol. 51, No. 2, 7 pages.

Schmid, "Raid Scaling Charts, Part 3:4-128 KB Stripes Compared", Tom's Hardware, Nov. 27, 2007, URL: http://www.tomshardware.com/reviews/RAID-SCALING-CHARTS.1735-4.html, 24 pages.

Stalzer, "FlashBlades: System Architecture and Applications", Proceedings of the 2nd Workshop on Architectures and Systems for Big Data, Jun. 2012, pp. 10-14, Association for Computing Machinery, New York, NY.

Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb. 2008, pp. 1-16, USENIX Association, Berkeley, CA.

* cited by examiner

OPTIMIZING STORAGE SYSTEM PERFORMANCE USING DATA CHARACTERISTICS

CROSS REFERENCE TO RELATED APPLICATIONS

This is a continuation application for patent entitled to a filing date and claiming the benefit of earlier-filed U.S. patent application Ser. No. 16/891,201, filed Jun. 3, 2020, which is a continuation application of and claims priority from U.S. patent application Ser. No. 15/419,747, filed Jan. 30, 2017, which is a non-provisional application of and claims priority from U.S. Provisional Patent Application No. 62/403,881, filed Oct. 4, 2016; U.S. Provisional Patent Application No. 62/403,894, filed Oct. 4, 2016; and U.S. Provisional Patent Application No. 62/404,095, filed Oct. 4, 2016, each of which is hereby incorporated by reference in their entirety.

TECHNICAL FIELD

The present disclosure is generally related to the generation of device firmware, and more particularly, to generating device firmware based on characteristics received from the device.

BACKGROUND

A storage device may include multiple data blocks that may store data at the storage device. The data blocks may be subjected to read operations or write operations. For example, stored data may be retrieved from a particular data block or new data may be written to the particular data block. The storage device may receive a series of read operations and write operations for various data blocks of the storage device. If the particular data block is currently subjected to a read operation or a write operation, then a subsequent read operation or write operation for the particular data block may be delayed until the prior read operation or write operation has completed.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
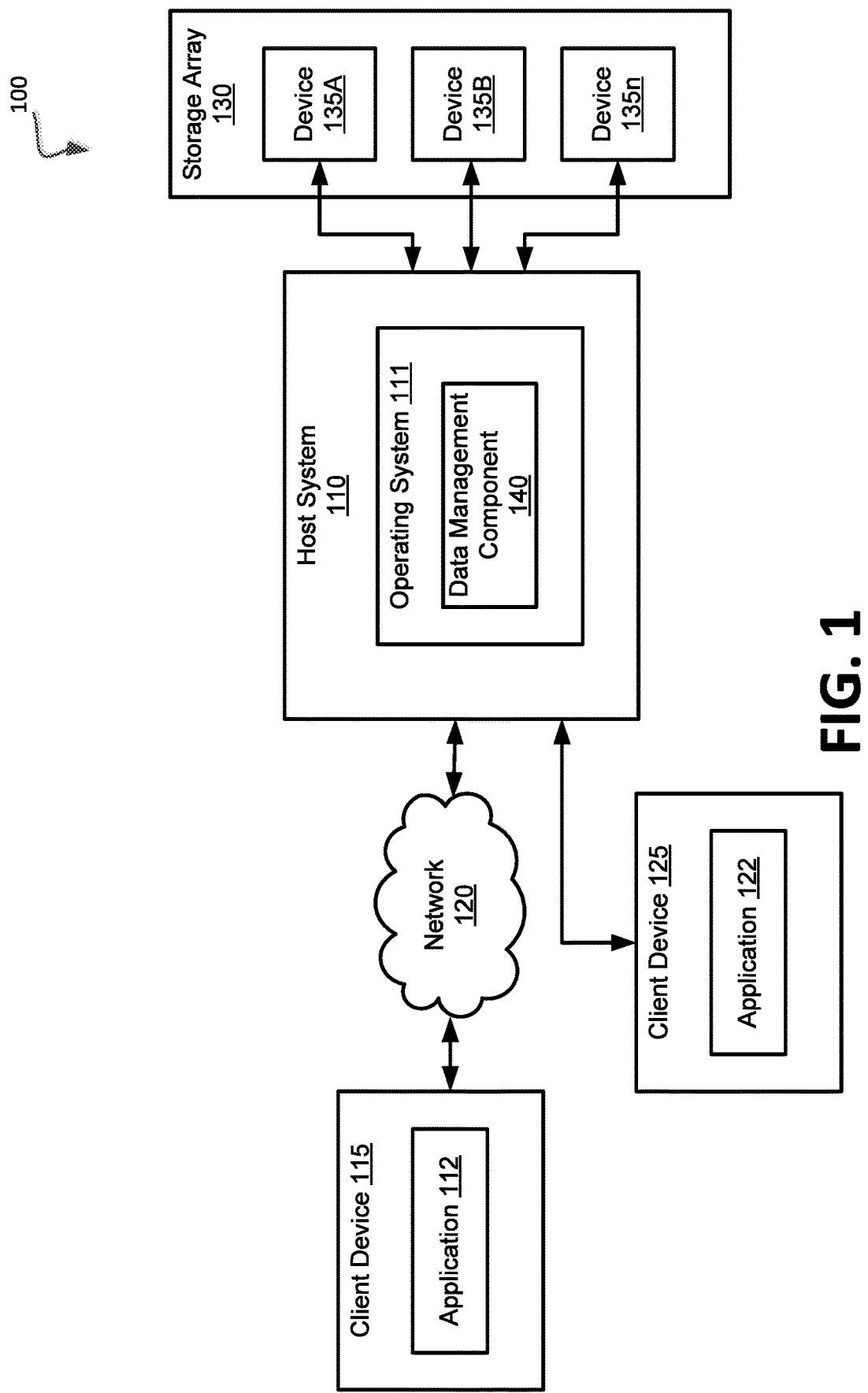
FIG. 1 illustrates an example system for data storage in accordance with some embodiments of the present disclosure.

Aspects of the present disclosure relate to using information specifying an organization of a data structure associated with a storage device. The data structure may store data relating to data blocks of the storage device that is used in a storage system. For example, the data structure may be created or generated by a firmware of the storage device (e.g., a solid-state storage device that is used in a solid-state storage array). The data in the data structure may be used by an operating system of a host system that uses the storage system that includes the storage device. For example, the operating system of the host system may use the data in the data structure that relates to the data blocks of the storage device when providing a read operation or a write operation to the storage device.

The firmware of the storage device may update the information or data in the data structure as operations are performed with the storage device. For example, the data in the data structure may be updated to reflect a number of write operations that have been performed on particular data blocks, a number of read operations that have been performed on particular data blocks, or other such characteristics of data blocks of the storage device that are changed over time. The data in the data structure may be organized as a table. For example, each data block may correspond to a row of the table. The data in a particular row of the data structure may specify characteristics of a particular data block of the storage device. For example, a row may include 100 bits and the first 20 bits of the row correspond to a first field that identifies a first characteristic (e.g., a number of write operations) of the particular data block, the next 30 bits of the row corresponds to a second field that identifies a second characteristic (e.g., a number of read operations) of the particular data block, etc. Thus, the data in the data structure may specify a series of data or bits that describe characteristics of data blocks of a storage device.

The firmware of the storage device may generate or create information that specifies which bits of a particular row of the data structure correspond to which characteristics associated with the data blocks of the storage device. For example, a directory (e.g., a second data structure) may include information that specifies an organization of the data in each row of the data structure. The directory may specify fields of each row by identifying a number of bits that correspond to each field and a location of each field in each row of the data structure (e.g., which bits of the row correspond to the respective field). Furthermore, each field may be associated with a characteristic of the respective data block. Thus, the data structure may include multiple rows with multiple bits and the directory may be used to the bits of a row that correspond to a particular field that is associated with a characteristic of a data block.

The data structure of the storage device may be changed in response to an updating or change of the firmware of the storage device. The firmware may be upgraded and may result in a changing of the organization of the data that is stored in the data structure associated with the storage device. For example, when the firmware is upgraded, the data structure that specifies characteristics of the data blocks of the storage device may include new fields for new characteristics or change the bits that are assigned to a particular field. Once the organization of the data structure has been changed, the operating system of the host system may not be able to correctly read the characteristics of the data blocks of the storage device that are specified by the data structure. For example, the operating system may not be aware that a particular set of bits of a particular row that previously corresponded to a particular characteristic of a data block has been changed to another set of bits in the same row of the data structure.

Aspects of the present disclosure address the above and other deficiencies by providing an updated directory generated by the firmware of the storage device to an operating system of a host system that uses the storage device. For example, the directory may be updated to reflect a new organization of data in the data structure when the firmware of the storage device is also updated. The operating system of the host system may retrieve the directory from the firmware of the storage device upon a power up or initialization process with the storage device. Thus, the operating system may retrieve the updated directory and be able to interpret the data in the data structure that specifies characteristics of the data blocks of the storage device. The operating system may subsequently use such data when performing read operations or write operations with the storage device.

Advantages of updating the directory and providing the updated directory to an operating system of the host system include, but are not limited to, the operating system of the host system being able to operate with storage devices with different versions of firmware. For example, the host system may retrieve different directories from different storage devices and may be able to interpret the data in different data structures that were created under different versions of the firmware. Thus, the retrieving of the directory may not necessitate an updating of the operating system to reflect the update of the firmware as instead a separate data structure or file (e.g., the directory) may be retrieved from the firmware of the storage device.

Aspects of the present disclosure may further relate to maintaining data associated with the storage device. For example, as previously described, a data structure may include data associated with characteristics of data blocks of the storage device. The data structure may be stored in the volatile memory of the storage device and may be generated by the firmware at initialization or power-up of the storage device. A second data structure may be stored in the non-volatile memory of the storage device where the second data structure also includes data associated with the characteristics of the data blocks of the storage device. A new data structure may be generated based on the data structure stored at the volatile memory and the second data structure stored at the non-volatile memory of the storage device. For example, one or more rules may be used to specify which values from the data structures are to be used for fields of the new data structure. Advantages of maintaining data associated with the storage device include, but are not limited to, protection of the data from failure of the storage device or an unexpected power failure.

Aspects of the present disclosure may further relate to scheduling operations for the storage device. For example, as previously described, the data structure that includes data associated with data blocks of the storage device may be made available to the operating system of the host system. The host system may thus receive characteristics of the data blocks of a storage device. Furthermore, the host system may be aware of the geometry of the storage device. For example, the availability of schedulable units internal to the storage device and that are to perform read or write operations may be understood by the host system and the information relating to the schedulable units and the characteristics of data blocks may be used to schedule subsequent read operations or write operations that are issued by the operating system to the storage device. Advantages of such scheduling include, but are not limited to, an increase in the performance of read operations and write operations to the storage device (e.g., a decrease in time to perform multiple read operations and/or write operations).

FIG. 1 is a block diagram illustrating a storage system 100. In general, the storage system 100 may include a host system 110 and a storage array 130, which is representative of any number of data storage arrays or storage device groups. As shown, storage array 130 includes storage devices 135A-n, which is representative of any number and type of storage devices (e.g., solid-state drives (SSDs)). Host system 110 may be coupled directly to client device 125 and the host system 110 may be coupled remotely over network 120 to client device 115. The host system 110 may be considered a storage controller for the storage array 130. Client devices 115 and 125 are representative of any number of clients which may utilize host system 110 for storing and accessing data in storage system 100. It is noted that some systems may include only a single client device, connected directly or remotely, to the host system 110.

Host system 110 may include software and/or hardware configured to provide access to storage devices 135A-n. Although host system 110 is shown as being separate from storage array 130, in some embodiments, host system 110 may be located within storage array 130. Host system 110 may include or be coupled to a base operating system (OS) 111, a volume manager, and additional control logic, such as a data structure component 140, for implementing the various techniques disclosed herein.

Host system 110 may include and/or execute on any number of processing devices and may include and/or execute on a single host computing device or be spread across multiple host computing devices, depending on the embodiment. In some embodiments, host system 110 may generally include or execute on one or more file servers and/or block servers. Storage controller 110 may use any of various techniques for replicating or maintaining data across devices 135A-n to prevent loss of data due to the failure of a device or the failure of storage locations within a device. Host system 110 may also utilize any of various data reduction technologies for reducing the amount of data stored in devices 135A-n by deduplicating common data (e.g., data deduplication, data compression, pattern removal, zero removal, or the like).

As shown in FIG. 1, the host system 110 may include a data management component 140. For example, the data management component 140 may be executed or provided by the operating system 111 of the host system 110. In some embodiments, the data management component may be provided or executed by an application. In one embodiment, the application is associated with the operating system 111. In one embodiment, the application is associated with a user space. As described in further detail below, the data management component 140 may retrieve data structures from the storage devices 135A to 135n of the storage array 130 and may use the data structures to perform operations with the storage devices 135A to 135n. For example, characteristics of data blocks of the storage devices 135A to 135n may be provided to the data management component 140 that is provided by an application or the operating system 111 of the host system 110. The data structures may be maintained and updated by the data management component 140. Furthermore, the data management component 140 may use information from the data structures to perform read operations and write operations with respect to the storage devices 135A to 135n.

In one embodiment, host system 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. The volumes may be logical organizations of data physically located on one or more of storage device 135A-n in storage array 130. Host system 110 may maintain a volume to medium mapping table to map each volume to a single medium, and this medium is referred to as the volume's anchor medium. A given request received by the host system 110 may indicate at least a volume and block address or file name, and the host system 110 may determine an anchor medium targeted by the given request from the volume to medium mapping table.

In various embodiments, multiple mapping tables may be maintained by the host system 110. These mapping tables may include a medium mapping table and a volume to medium mapping table. These tables may be utilized to record and maintain the mappings between mediums and underlying mediums and the mappings between volumes and mediums. Host system 110 may also include an address translation table with a plurality of entries, wherein each entry holds a virtual-to-physical mapping for a corresponding data component. This mapping table may be used to map logical read/write requests from each of the client devices 115 and 125 to physical locations in storage devices 135A-n. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In some embodiments, storage within storage system 100 may be embodied as object storage, where data is managed as objects. Each object may include the data itself, a variable amount of metadata, and a globally unique identifier, where object storage can be implemented at multiple levels (e.g., device level, system level, interface level). In addition, storage within the storage system 100 may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

In alternative embodiments, the number and type of client devices, host systems, networks, storage arrays, and storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, Infiniband, NVMe-F, PCIe and any new emerging storage interconnects may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the storage devices 135A-n appear to the client devices 115 and 125 as locally attached storage.

Client devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, client device 115 includes application 112 and client device 125 includes application 122. Applications 112 and 122 may be any computer application programs designed to utilize the data from the storage devices 135A to 135n. Applications 112 and 122 may issue requests to read data from or write data to storage devices within storage system 100. For example, as noted above, the request may be to read data or write data.

Figure 2:
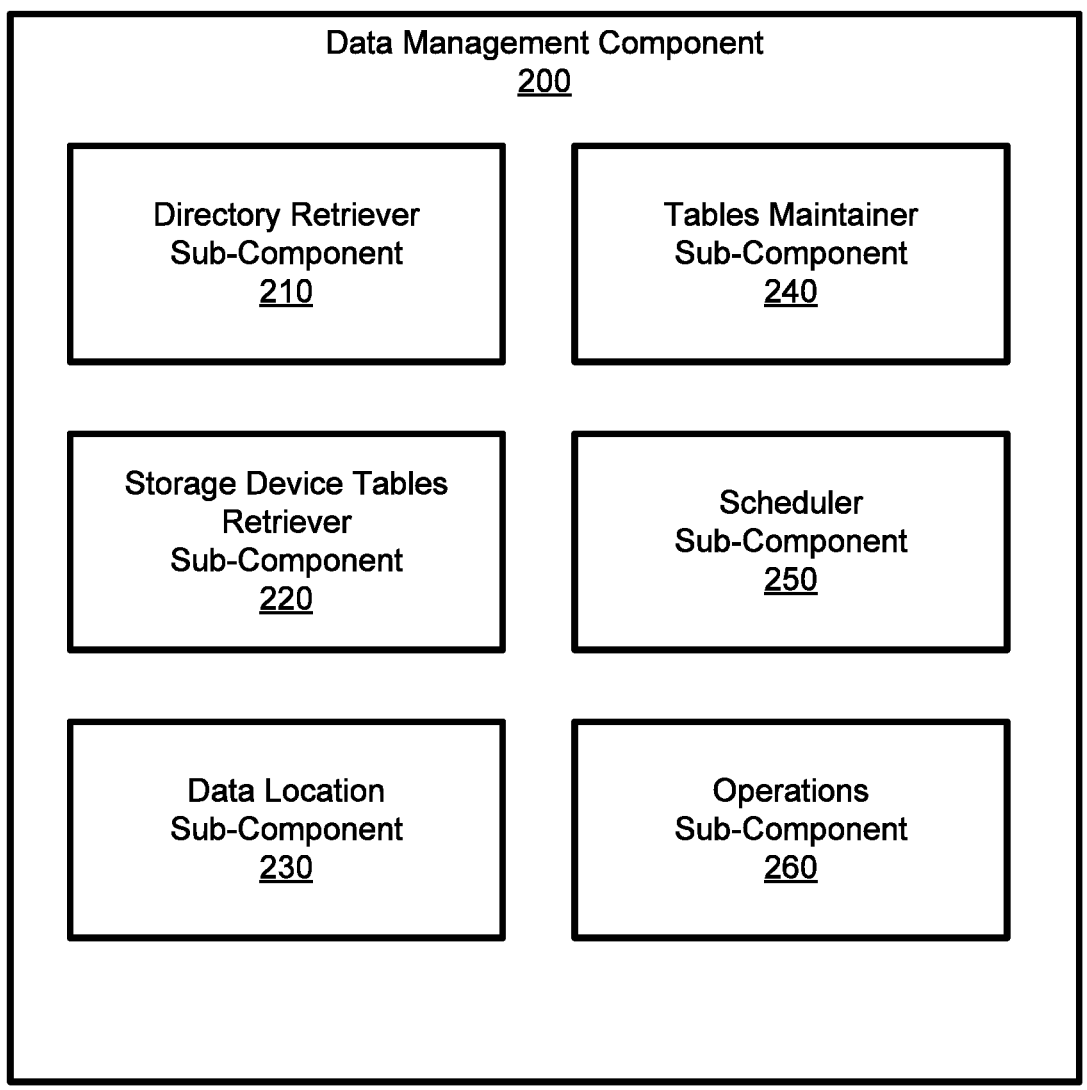
FIG. 2 illustrates an example data management component in accordance with some embodiments.

FIG. 2 illustrates an example data management component 200. In general, the data management component 200 may correspond to the data management component 140 of FIG. 1. The data management component 200 may include a directory retriever sub-component 210, a storage device tables retriever sub-component 220, a data location sub-component 230, a tables maintainer sub-component 240, a scheduler sub-component 250, and an operations sub-component 260. In alternative implementations, the functionality of one or more of the sub-components may be combined or divided.

As shown in FIG. 2, the data management component 200 may include a directory retriever sub-component 210 and a storage device tables retriever sub-component 220. For example, a first data structure (e.g., the directory) and a second data structure (e.g., one or more tables) may be retrieved from a storage device of a storage array. The data location sub-component 230 may use the directory to identify locations of data associated with characteristics of data blocks of the storage device within the retrieved tables. Further details with regard to the directory, one or more tables, and an organization of information in the tables are described in conjunction with FIGS. 3-6.

The data management component 200 may further include a tables maintainer sub-component 240. For example, the tables maintainer sub-component 240 may be used to maintain or update one or more data structures (e.g., one or more tables) of the storage device. Further details with regards to maintaining a data structure associated with the storage device are described in conjunction with FIGS. 7-9. The data management component 200 may further include a scheduler sub-component 250 that may schedule one or more operations for the storage device. For example, write operations and read operations may be scheduled based on retrieved data structures and a topology of the storage device as described in conjunction with regards to FIGS. 10-13.

Referring to FIG. 2, the data management component 200 may further include an operations sub-component 260 that may perform a read operation or a write operation at the storage device. For example, the read operation or the write operation may be provided by an operating system or an application that includes the data management component 200.

Figure 3:
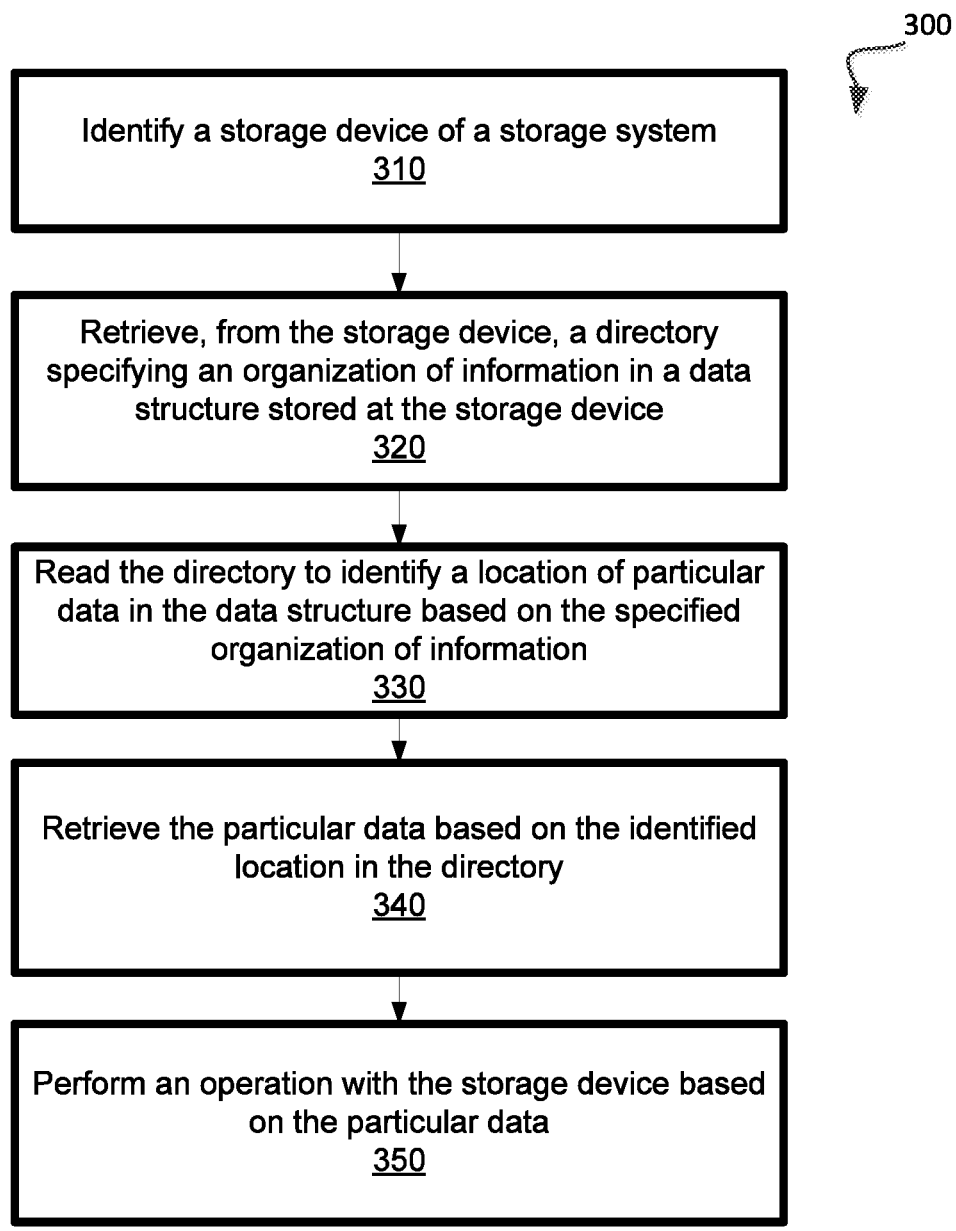
FIG. 3 is an example method to perform an operation with a storage device based on a directory of a data structure in accordance with some embodiments of the present disclosure.

FIG. 3 is an example method to perform an operation with a storage device based on a directory of a data structure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 300.

As shown in FIG. 3, the method 300 may begin with the processing logic identifying a storage device of a storage system (block 310). For example, the storage device may be a solid-state storage device (e.g., a flash-based storage device) that is part of a storage array that includes a host system that is running an operating system. The processing logic may further retrieve, from the storage device, a directory that specifies an organization of information in a data structure stored at the storage device (block 320). The directory may be another data structure that is generated or created by the firmware of the storage device that is operated from a storage controller of the storage device. In some embodiments, the directory may be stored in a buffer memory or a volatile memory of the storage controller of the storage device. Thus, the directory may be retrieved by the operating system of the host system from the storage controller. In some embodiments, the directory may be retrieved when the operating system starts up or is initialized with the storage device (e.g., the directory is retrieved before the operating system performs a read or write operation for the storage device). Furthermore, the directory may specify a format or an organization of data stored in a data structure that is stored at the storage device. The data structure may be stored in a non-volatile memory of the storage device.

The data structure may include data corresponding to characteristics of data blocks of the storage device. Examples of such data include, but are not limited to, a number of read operations that have been performed for a particular data block, a number of write operations that have been performed for the particular data block, a time that data was written to for the particular data block, or any other characteristic associated with a state of a data block. In some embodiments, one of the data structures may specify characteristics of the storage device such as, but not limited to, a number of power cycles of the storage device, how long the storage device has been in operation, a total number of read operations or write operations performed with the storage device, etc.

Referring to FIG. 3, the processing logic may read the directory to identify a location of particular data in the data structure based on the specified organization of information (block 330). For example, the operating system of the host system may use the directory to understand or interpret the data structure stored at the storage controller of the storage device. In some embodiments, the operating system may retrieve the data structure at the storage controller. In the same or alternative embodiments, the storage controller may store multiple data structures. Thus, where a single data structure is described herein, multiple data structures may also be used. The data structures may be a table with multiple rows and where each of the rows corresponds to a different data block of the storage device. The data in a particular row may correspond to various characteristics of the respective data block corresponding to the particular row. Further details with regard to the data structure are described in conjunction with FIG. 5.

The processing logic may further retrieve the particular data based on the identified location in the directory (block 340). For example, the directory may specify a format or organization of data in each row of the data structure. The format or organization may specify fields (i.e., data fields) of the row where each field is associated with a name (e.g., a type of data), a number of bits of the row that are included in the field (e.g., the size of the field), and an offset for the field (e.g., a difference between the start of the row or the first bit of the row and the start of the data field or the first bit of the data field within the row). As an example, the particular data may relate to a number of write operations that have been performed with a particular data block of the storage device. In some embodiments, the operating system of the host system may retrieve a particular type of data from multiple rows of the data structure. For example, the number of write operations from each data block may be identified by using the directory to identify the bits of each row of the data structure that specifies the number of write operations for the respective data block. Subsequently, the processing logic may perform an operation with the storage device based on the particular data (block 350). For example, a read operation or a write operation may be issued by the operating system for the storage device based on the particular data from the data structure that has been identified by using the directory that has been retrieved from the storage device.

Figure 4:
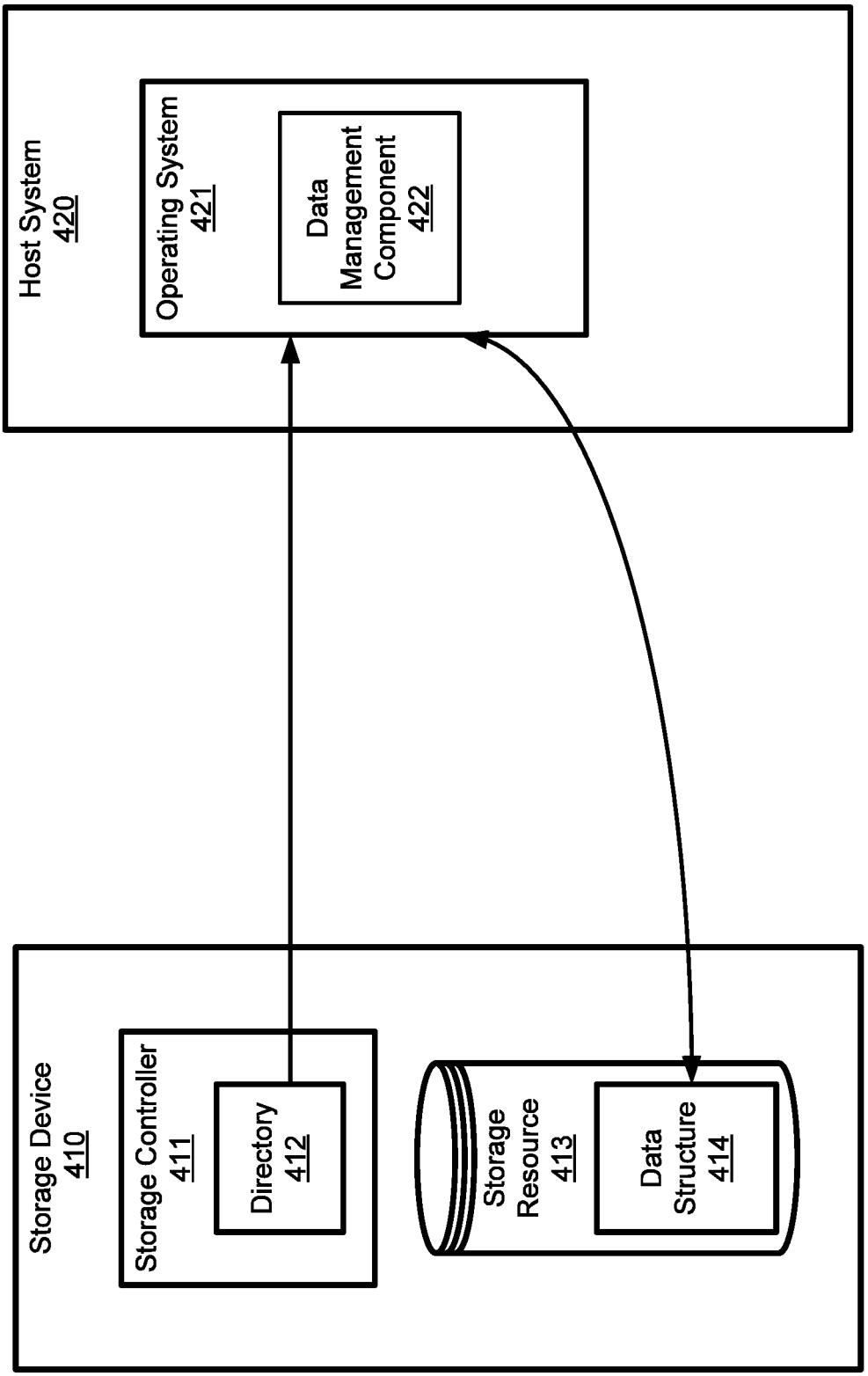
FIG. 4 is an example environment of a storage device with a host system using a directory specifying an organization of a data structure associated with the storage device in accordance with some embodiments.

FIG. 4 is an example environment 400 of a storage device with a host system using a directory specifying an organization of a data structure associated with the storage device. In general, the environment 400 may include an operating system that includes a data management component 422 that may correspond to the data management component 140 or data management component 200 of FIG. 1 or 2.

As shown in FIG. 4, the storage device 410 may include a storage controller 411 that operates a firmware of the storage device 410. A buffer memory, or a volatile memory, of the storage controller may store the directory 412. As previously described, the directory 412 may specify data associated with characteristics of data blocks of the storage resource 413 of the storage device 410. In some embodiments, the directory 412 may be generated by the firmware of the storage controller 411 in response to a power up or initialization of the storage device 410. The storage resource 413 may correspond to non-volatile memory (e.g., flash memory) of the storage device 410 and may include the data structure 414 (or multiple data structures) that includes the characteristics of the data blocks.

The host system 420 may include an operating system 421 that may retrieve the directory 412 from the storage controller 411 and may use the directory 412 to understand a current format or organization of the data structure 414 that has been used by the current version of the firmware of the storage controller 411. For example, the data management component 422 of the operating system 421 may retrieve the directory 412 and the data structure 414. In some embodiments, the data management component 422 may be provided by an application within the operating system 421.

In operation, the host system 420 may retrieve the directory 412 when first connecting or coupling with the storage device 410 and before the host system 420 issues a write operation or a read operation for data at data blocks of the storage device 410. The directory 412 may specify a first organization of data stored within rows of the data structure 414 (e.g., a table). If the host system 420 connects with another storage device (not shown), then the host system 420 may also retrieve the directory of the other storage device where the other directory may specify a second organization of data stored within rows of the data structure of the other storage device. Thus, the host system 420 may retrieve different directories from different storage devices to understand the organization of data stored at rows of different data structures of different storage devices.

Figure 5:
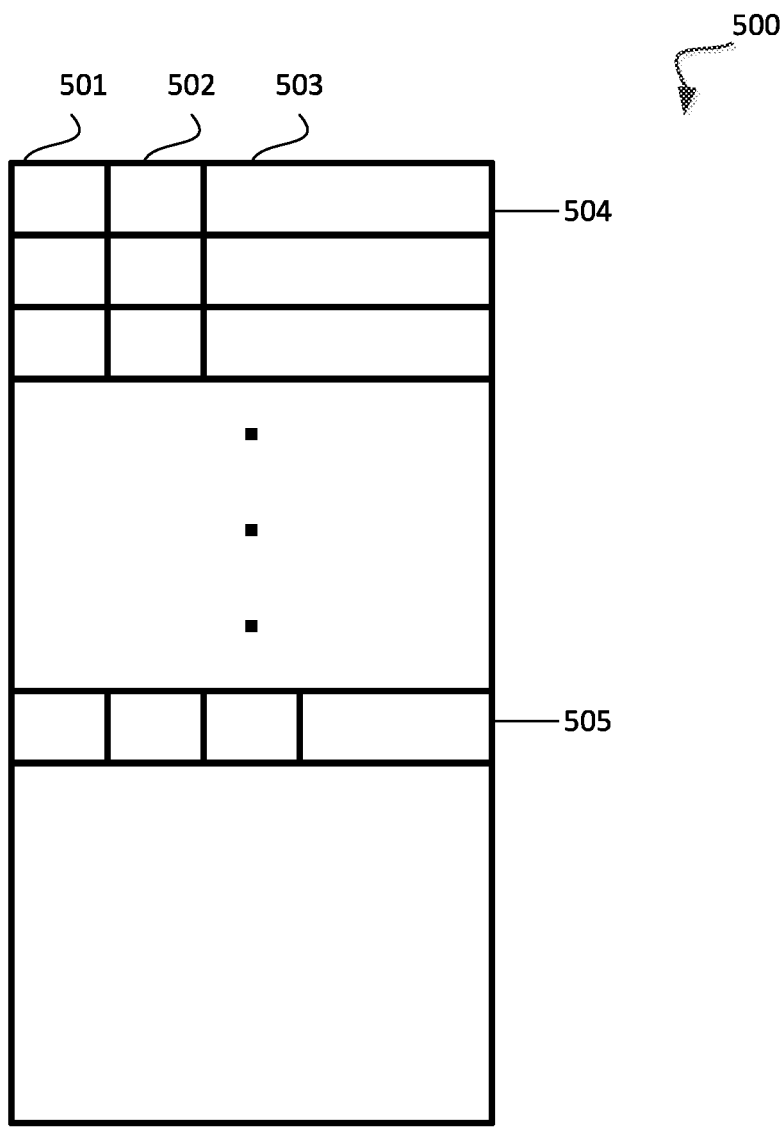
FIG. 5 illustrates an example data structure with fields specified by a directory in accordance with some embodiments.

FIG. 5 illustrates an example data structure 500 with fields specified by a directory. In general, the data structure 500 may correspond to the data structure 414 of FIG. 4 or a data structure associated with a data management component 140 or data management component 200 of FIG. 1 or 2.

As shown in FIG. 5, the data structure 500 may include multiple rows. For example, a row 504 may correspond to a data block of a storage device. The row 504 may include multiple bits and an organization of the bits of the row 504 may be specified by a directory. For example, the directory may specify a first field 501, second field 502, and a third field 503 of the row 504 where each of the first field 501, second field 502, and third field 503 specifies different characteristics of the data block corresponding to the row 504. The first field, second field, and third fields 501, 502, and 503 may each be referred to as a data field. The directory may specify the name, location (e.g., offset from the start of the start of the row to the start of the field), and a length (e.g., a number of bits of the row) of the field. In some embodiments, the directory may specify, for each row, the various fields in the row where different rows may include a different organization of data and thus different fields. For example, as shown, the row 505 may include a different organization of data. For example, as shown, the row 505 may include a larger number of fields than the row 504. Thus, a directory may specify different fields for different rows of a table. The different data fields may be specified by different lengths and different offsets from the start of the row.

Figure 6:
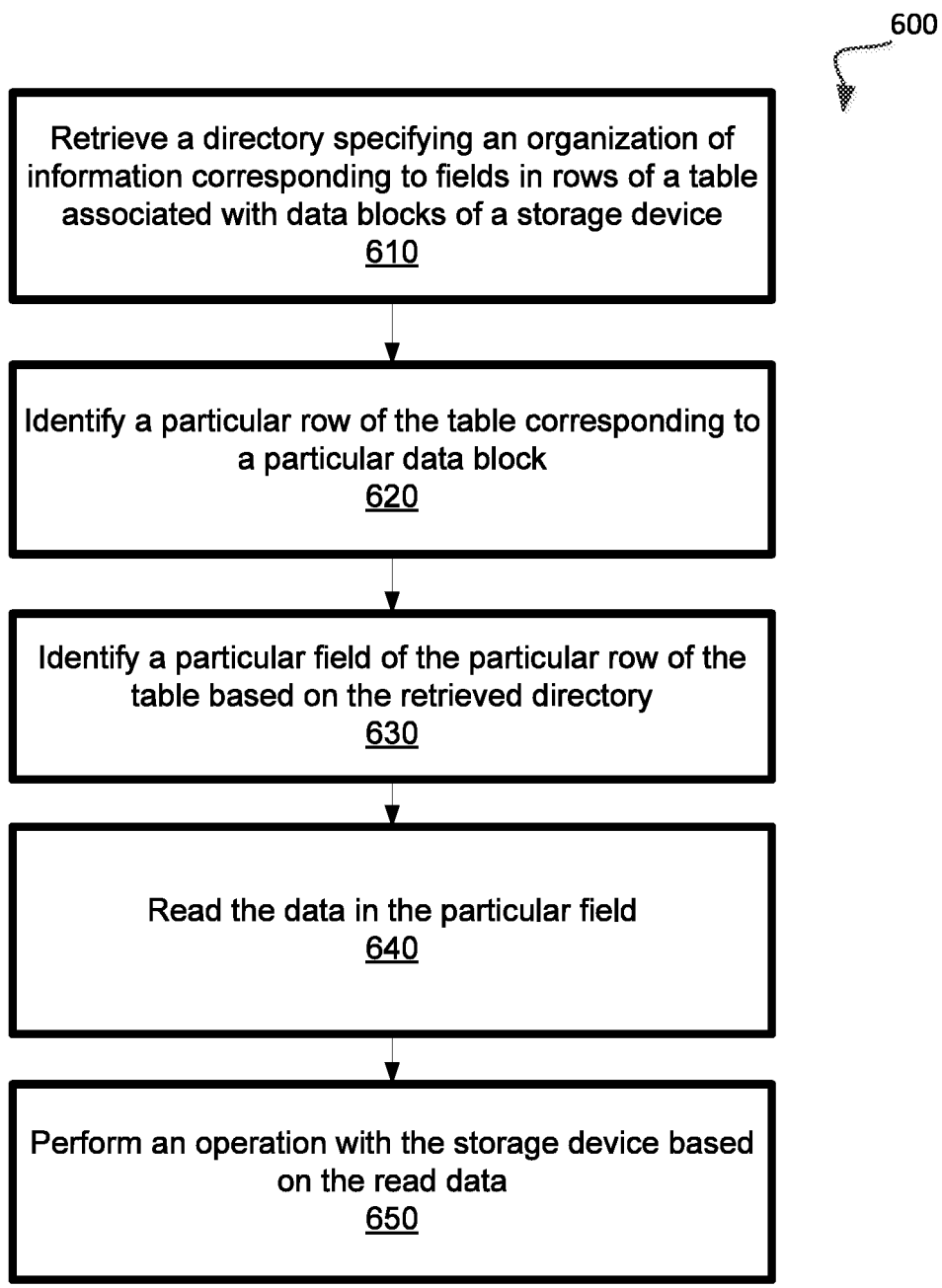
FIG. 6 is an example method to perform an operation with a storage device based on a field of the data structure that is identified based on a directory in accordance with some embodiments of the present disclosure.

FIG. 6 is an example method 600 to perform an operation with a storage device based on a field of the data structure that is identified based on a directory. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 600.

As shown in FIG. 6, the method 600 may begin with the processing logic retrieving a directory specifying an organization of information corresponding to fields in rows of a table associated with data blocks of a storage device (block 610). For example, the directory may be retrieved from the storage controller of the storage device or may have been previously retrieved from the storage controller and is stored at a host system. The processing logic may further identify a particular row of the table corresponding to a particular data block (block 620). For example, one row of multiple rows of a table that is assigned to the particular data block may be identified. The row may be identified by using a directory that specifies the organization of information in the table. The processing logic may further identify a particular field of the particular row of the table based on the retrieved directory (block 630). For example, the operating system of the host system may seek a field with a particular name (e.g., number of write operations) and may use the directory to identify bits of the particular row that are assigned to the particular field. The processing logic may subsequently read the data in the particular field (block 640). For example, the operating system of the host system may request the particular row from the storage controller of the storage device and may identify the particular field from the received row. In some embodiments, the operating system may receive the entire table and may then identify the particular field from the received table. The processing logic may subsequently perform an operation with the storage device based on the read data (block 650). For example, the operating system of the host system may perform a read operation or a write operation based on the read data.

In some embodiments, the operating system may select a table (e.g., data structure) from multiple tables stored at the storage controller of the storage device by using the directory. For example, the directory may specify a category or name that is assigned to each table the operating system may select one of the tables by using the directory. Subsequently, the operating system may use the directory to interpret the fields of each row of the table as previously described. In some embodiments, the directory may be stored at a defined location at the storage controller or other such memory location at the storage controller and the operating system may retrieve the directory at the defined location when the host system first connects with the storage device.

In some embodiments, a directory and one or more tables may be retrieved from multiple storage devices of a storage array. The storage devices of the storage array may each include different directories that specify different fields for the respective tables or data structures. For example, a first storage device may be operating by a first firmware of a first version and a second storage device may be operated by a second firmware of a different second version. A first directory of the first storage device may specify different bits of a table as being associated to a particular field associated with a characteristic of a data block than a second directory of the second storage device.

As previously described aspects of the present disclosure may further relate to maintaining data associated with the storage device. For example, the data structures may correspond to one or more tables. The data structures may be stored in a volatile memory of the storage controller of the storage device. However, if the storage device loses access to power and is turned off, then the data structures in the volatile memory may be deleted or removed. When the storage device regains access to power and is turned back on, the data structures in the volatile memory may again be generated based on data stored at data blocks of the storage device. For example, characteristics of the data blocks may be stored with data at the respective data block and the data structures may be generated based on the characteristics stored alongside with the data at the data blocks of the storage device. However, for certain types of characteristics, the data stored at the data blocks may not be accurate. For example, if the data block was erased, then characteristics of the data block that were stored at the data block may also be erased. As a result, the data structure stored at the volatile memory of the storage controller may not include the most recent or accurate characteristics of the data blocks of the storage device.

An operating system of a host system that uses the storage device may retrieve a portion of or all of the data structures stored at the volatile memory and may write the retrieved data structures to the non-volatile memory of the storage device that is not deleted or lost should the storage device become powered down. However, since the data structures may be frequently updated, the operating system may not store the updated data structures at the non-volatile memory of the storage device at each update. Instead, the operating system may locally update the data structures and then periodically store the updated data structures at the non-volatile memory of the storage device. As a result, the volatile memory of the storage device may store a first set of data structures (e.g., a first set of tables) and the non-volatile memory of the storage device may store a second set of data structures (e.g., a second set of tables) where the different sets of data structures may store a different value for a particular characteristic of a particular data block. For example, a row of the first set of data structures for a data block may specify a first value for a characteristic of the data block and a corresponding row of the second set of data structures for the data block may specify a second value for the characteristic of the data block.

In order to resolve such a discrepancy, one or more rules may be used to create a new data structure with values selected from a combination of the first set of data structures and the second set of data structures. The new data structure may then be used by the operating system of the storage device to perform read operations or write operations with the storage device.

Figure 7:
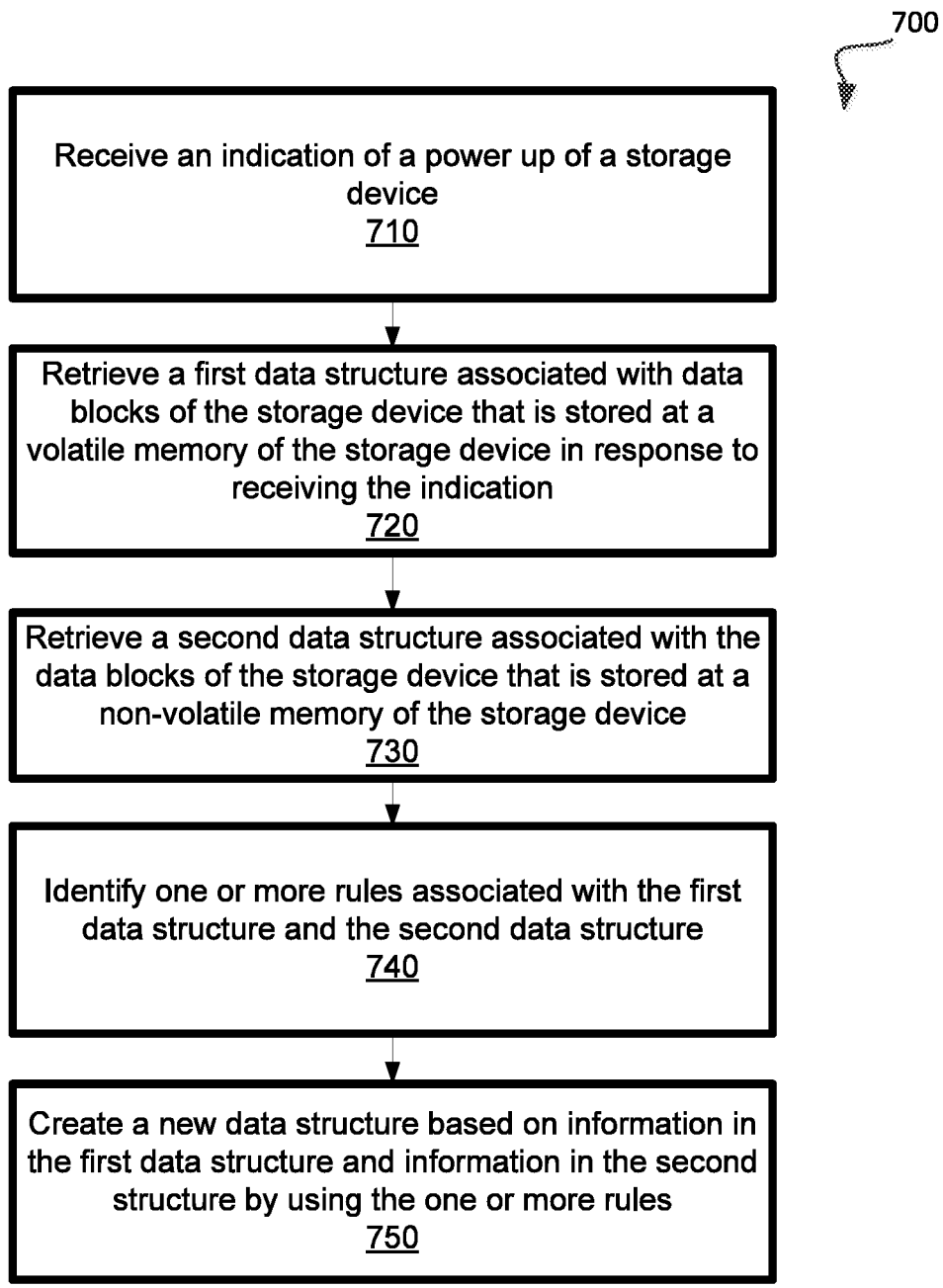
FIG. 7 is an example method to create a new data structure based on at least one rule and a first data structure and a second data structure in accordance with some embodiments of the present disclosure.

FIG. 7 is an example method 700 to create a new data structure based on at least one rule and a first data structure and a second data structure. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 700.

As shown in FIG. 7, the method 700 may begin with the processing logic receiving an indication of a power up of a storage device (block 710). The processing logic may further retrieve a first data structure associated with data blocks of the storage device that is stored at a volatile memory of the storage device in response to receiving the indication of the power up of the storage device (block 720). For example, an operating system of a host system may retrieve the first data structure (or a first set of data structures) from a volatile memory of a storage controller of the storage device. The first data structure may be generated at power-up of the storage device. For example, the first data structure may be generated based on data stored at data blocks of the storage device. Furthermore, the processing logic may retrieve a second data structure associated with the data blocks of the storage device that is stored at a non-volatile memory of the storage device (block 730). For example, the operating system may retrieve the second data structure (or a second set of data structures) form a non-volatile memory of the storage device.

The processing logic may subsequently identify one or more rules associated with the first data structure and the second data structure (block 740). The one or more rules may specify when a value for a particular field (e.g., an entry) in a row for the new data structure should be selected from the first data structure or the second data structure. For example, a rule may specify that a larger value for the field from the first data structure or the second data structure should be selected for the corresponding field in the new data structure. In some embodiments, the rule may specify that the larger value should be selected when the field corresponds to a number of read operations or a number of write operations that have been performed with the respective data block. In the same or alternative embodiments, the rule may specify that a more recent value should be selected between the values from the first data structure and the second data structure. The one or more rules may specify that if the field (i.e., an entry) of the new data structure is assigned to a number of read operations for the respective data block, then the value from the information of the second data structure may be selected instead of the value from the information of the first data structure. Similarly, the one or more rules may further specify that if the field or entry of the new data structure is assigned to a number of erase counts for the respective data block, then the value from the information of the second data structure may be selected instead of the value from the information of the first data structure. Thus, the one or more rules may specify to select a value for a new entry in the new data structure based on values of the first and second data structures and/or based on the characteristic of the data block that is represented by the value.

Referring to FIG. 7, the processing logic may further create a new data structure based on information in the first data structure and information in the second structure by using the one or more rules (block 750). For example, the one or more rules may be used to specify when, for a particular field or entry in a particular row of the new data structure, to provide a value from the first data structure or the second data structure. The new data structure may be stored at the non-volatile memory of the storage device.

Figure 8:
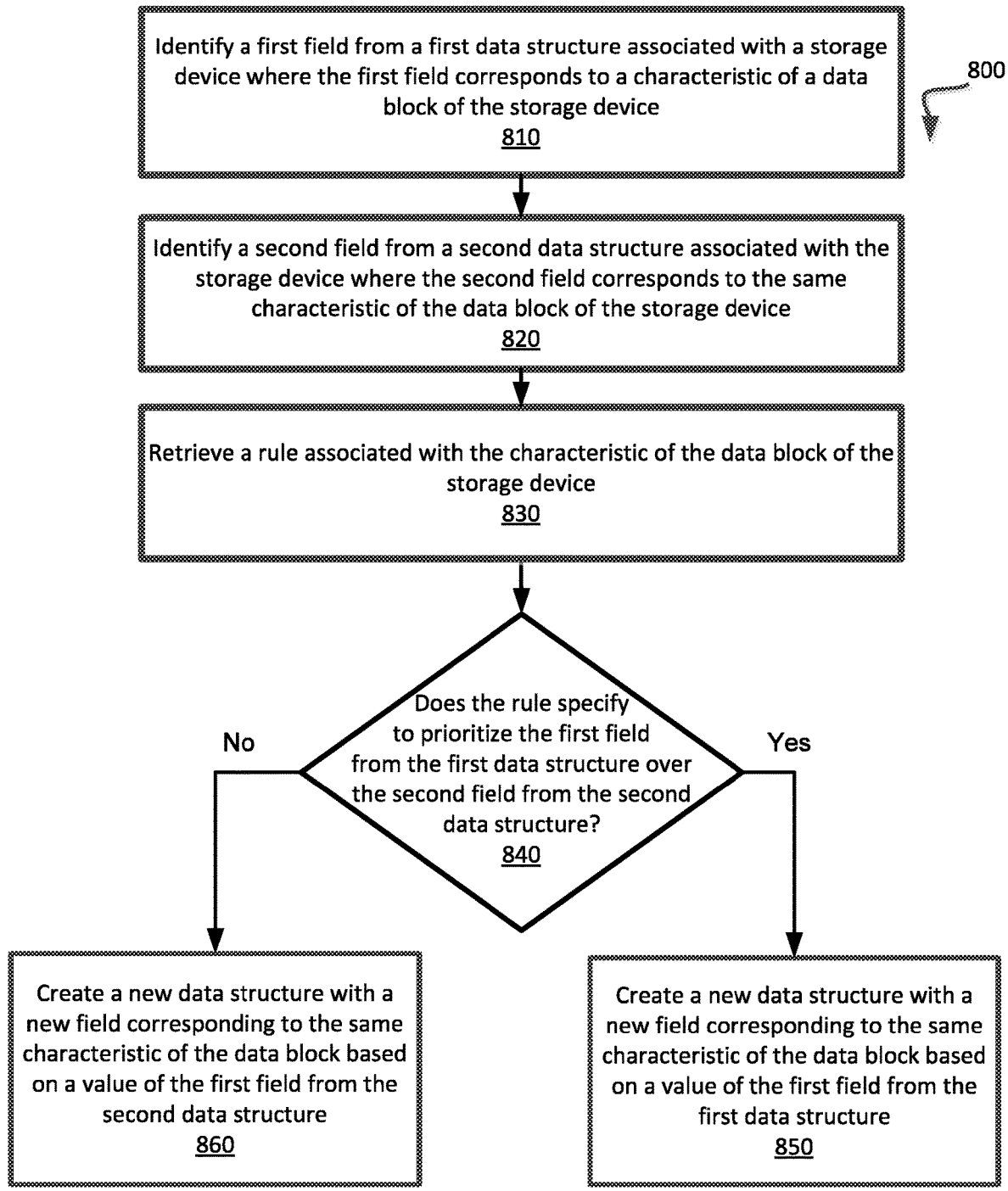
FIG. 8 is an example method to create a new data structure with a new field based on a rule in accordance with some embodiments of the present disclosure.

FIG. 8 is an example method 800 to create a new data structure with a new field based on a rule. In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 800.

As shown in FIG. 8, the method 800 may begin with the processing logic identifying a first field from a first data structure associated with a storage device where the first field corresponds to a characteristic of a data block of the storage device (block 810). For example, the first field (also referred to as an entry) may be a field of a row of a table that is assigned to the data block as previously described. The processing logic may also identify a second field from a second data structure associated with the storage device where the second field corresponds to the same characteristic of the data block of the storage device (block 820). The first field and the second field may thus be assigned to the same characteristic of the same data block of the same storage device. The processing logic may further retrieve a rule associated with the characteristic of the data block of the storage device (block 830). For example, the rule may be assigned to the characteristic of the data block. The rule may specify a value that is to be selected (i.e., prioritized) between the first data structure and the second data structure for the type of characteristic corresponding to the first field and the second field. The processing logic may subsequently determine whether the rule specifies to prioritize the first field from the first data structure over the second field from the second data structure (block 840). If the rule specifies to prioritize the first field from the first data structure over the second field from the second data structure, then the processing logic may create a new data structure with a new field corresponding to the same characteristic of the data block based on a value of the first field from the first data structure (block 850). For example, the new field of a row that is assigned to the same data block in the new data structure may be assigned a value from the first field of the same row representing the same data block from the first data structure. Otherwise, if the rule does not specify to prioritize the first field from the first data structure over the second field from the second data structure, then then the processing logic may create a new data structure with a new field corresponding to the same characteristic of the data block based on a value of the first field from the second data structure (block 860).

Thus, a rule may be assigned to a type of characteristic of a data block that corresponds to the new entry of the new data structure. As an example, a first rule may specify that if the characteristic is a number of read operations of the data block, then the value from the second data structure should be prioritized over the value from the first data structure. A second rule may specify that if the characteristic is a number of write operations of the data block, then the value from the first data structure should be prioritized over the value from the second data structure.

Figure 9:
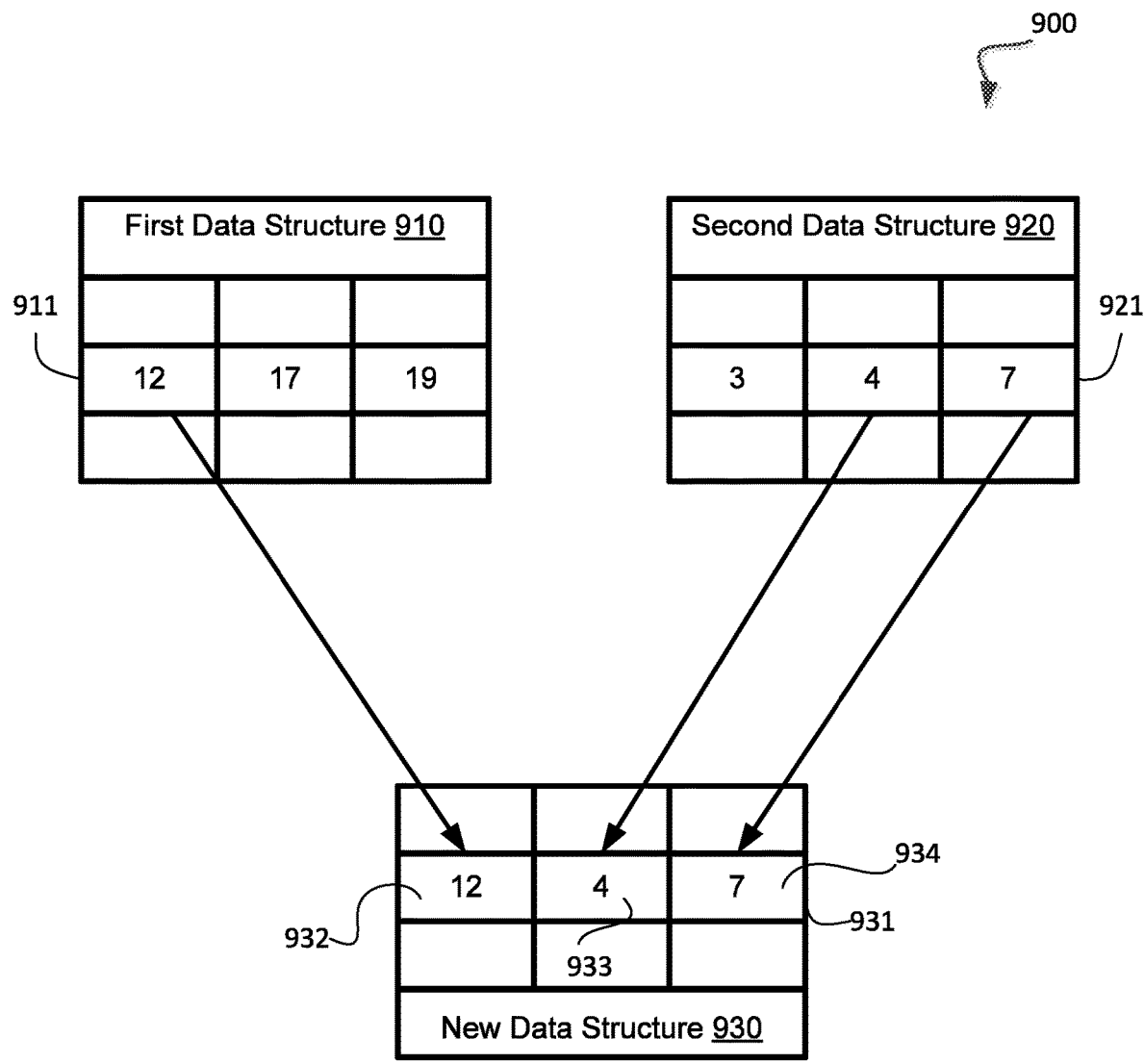
FIG. 9 is an example environment to select a value between a field of a first data structure and a corresponding field of a second data structure in accordance with some embodiments.

FIG. 9 is an example environment 900 to select a value between a field of a first data structure and a corresponding field of a second data structure. In general, the environment 900 may include a new data structure with values selected from a combination of the first data structure and the second data structure. The new data structure may be generated by the data management component 140 or data management component 200 of FIG. 1 or 2.

As shown in FIG. 9, a first data structure 910 and a second data structure 920 may be used to create a new data structure 930. For example, the data structures 910, 920, and 930 may be tables with rows where each row includes multiple fields or entries. Each of the fields or entries may correspond to a different characteristic or state of the data block that is represented by the row. The fields or entries of the row 931 of the new data structure 930 may be populated with values from the row 911 of the first data structure 910 and values from the row 921 of the second data structure 921. For example, the field 932 may correspond to a first characteristic of the data block that is represented by the row 911, row 921, and row 931. A first rule may specify that the value from the first data structure 910 is to be prioritized over the value from the second data structure 920. Thus, the field 932 in the row 931 of the new data structure 930 may be provided the value from the first field of the row 911 of the first data structure 910. The field 933 may correspond to a second characteristic of the data block and a second rule may specify that the value from the second data structure 920 is to be prioritized over the value from the first data structure 910. Thus, the field 933 in the new data structure 930 may be provided the value from the second field of the row 921 of the second data structure 920. Furthermore, the field 934 may correspond to a third characteristic and a third rule may specify that the value form the second data structure 920 is to be selected to be provided to the third field 934.

In some embodiments, after the new data structure 930 has been created based on values from fields of the first and second data structures 910 and 920 being selected by various rules, the new data structure (e.g., the new plurality of tables) may be stored at the non-volatile memory of the storage device. Furthermore, as subsequent read operations and write operations are performed, the new data structure that is stored at the non-volatile memory may be updated by the operating system of the host system that includes the storage device.

As previously described, aspects of the present disclosure may further relate to scheduling operations for the storage device. The operating system of the host system may schedule read operations or write operations to data blocks of the storage device. For example, the topology of the storage device and characteristics of the data blocks of the storage device may be known to the operating system by using the data structure that is retrieved from the storage device as previously described. The topology of the storage device may be the arrangement of storage packages (e.g., flash memory packages) and an arrangement of schedulable units (e.g., storage dies or flash memory dies) within each of the storage packages. As a result, the topology of schedulable units and the characteristics of the data blocks within the schedulable units may be known to the operating system of a host system that uses the storage device. In some embodiments, the scheduling of such operations with the schedulable units may be performed by an application that is executed within or by the operating system.

The schedulable units may each be capable of performing a read operation or a write operation at the same time. For example, each of the schedulable units may be capable of performing any combination of a read operation or a write operation in parallel with the other schedulable units. Thus, a schedulable unit is a storage die of a storage package of the storage device that may independently perform a read operation or a write operation in parallel with other schedulable units of the same storage device Since the operating system (or an application) issues read operations and write operations to be performed by the various schedulable units of the storage device, the operating system may be aware of the ordering of such read and write operations and when such read and write operations are to be performed by each of the schedulable units.

For example, as previously described, the data structure that includes data associated with characteristics of the data blocks of the storage device may be made available to the operating system (or application) of the host system. The host system may thus receive characteristics of the data blocks of a storage device. Furthermore, the host system may be aware of the topology of the storage device. For example, the availability of schedulable units internal to the storage device and that are to perform read or write operations may be understood by the operating system of the host system and the information relating to the schedulable units and the characteristics of data blocks may be used by the operating system to schedule subsequent read operations or write operations that are issued by the operating system or application to the storage device. Advantages of such scheduling include, but are not limited to, an increase in the performance of read operations and write operations to the storage device (e.g., a decrease in time to perform multiple read operations and/or write operations).

Figure 10:
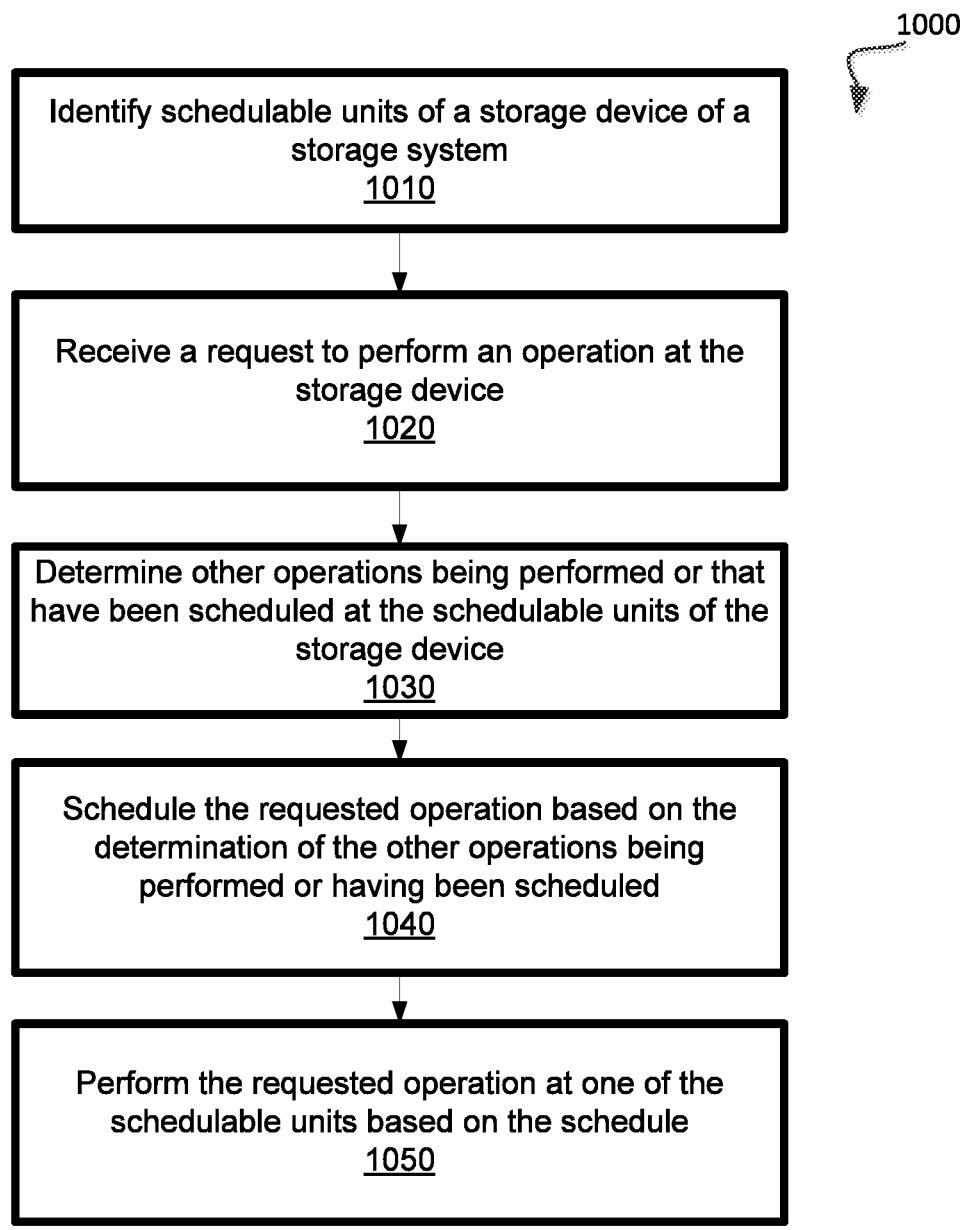
FIG. 10 is an example method to perform a requested operation based on other operations of schedulable units of a storage device in accordance with some embodiments of the present disclosure.

FIG. 10 is an example method 1000 to perform a requested operation based on other operations of schedulable units of a storage device. In general, the method 1000 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 1000.

As shown in FIG. 10, the method 1000 may begin with the processing logic identifying schedulable units of a storage device of a storage system (block 1010). For example, an operating system or an application of the operating system may receive information identifying the topology of the schedulable units of the storage device. In some embodiments, the information may be identified from a data structure (e.g., one or more tables) associated with characteristics of data blocks of the storage device as previously described. The operating system may be executed by a host system that is associated with a storage array that includes the storage device. The processing logic may further receive a request to perform an operation at the storage device (block 1020). For example, the operating system or the application may receive a request from a client system (e.g., a user) or a system task (e.g., another software entity or component) to perform a read operation or a write operation at the storage device. The processing logic may subsequently determine other access operations that are being performed or have been scheduled at the schedulable units of the storage device (block 1030). For example, other read operations and write operations that have been received by the operating system or the application from a client system or system task may be identified. In some embodiments, the other access operations that are being performed or that have been scheduled at the schedulable units may be associated with a garbage collection process. In general, the garbage collection process may remove or delete data stored at a set of data blocks so that data at a first portion of the set of data blocks is deleted or removed and copied to a second portion of the set of data blocks. As a result, the garbage collection process may read data and write data at different data blocks of different schedulable units of a storage device.

Furthermore, the processing logic may schedule the requested operation based on the determination of the other access operations that are being performed or having been scheduled to be performed (block 1040). For example, the requested operation may be a write operation to store data at a data block of the storage device. A data block of the storage device may be selected to store the data based on a schedulable unit of the storage device that is available. For example, the write operation may be performed by a schedulable unit that includes the selected data block when the schedulable unit is currently available to perform the write operation at the data block (e.g., the schedulable unit is not currently performing another access operation or will be performing another access operation before the requested operation can be performed). In some embodiments, the requested operation may further be performed based on characteristics of data blocks (e.g., from the data structure) of the storage device and/or characteristics associated with an entity that has requested the operation as further described in conjunction with FIG. 12. The processing logic may further perform the requested operation at one of the schedulable units based on the schedule (block 1050).

Figure 11:
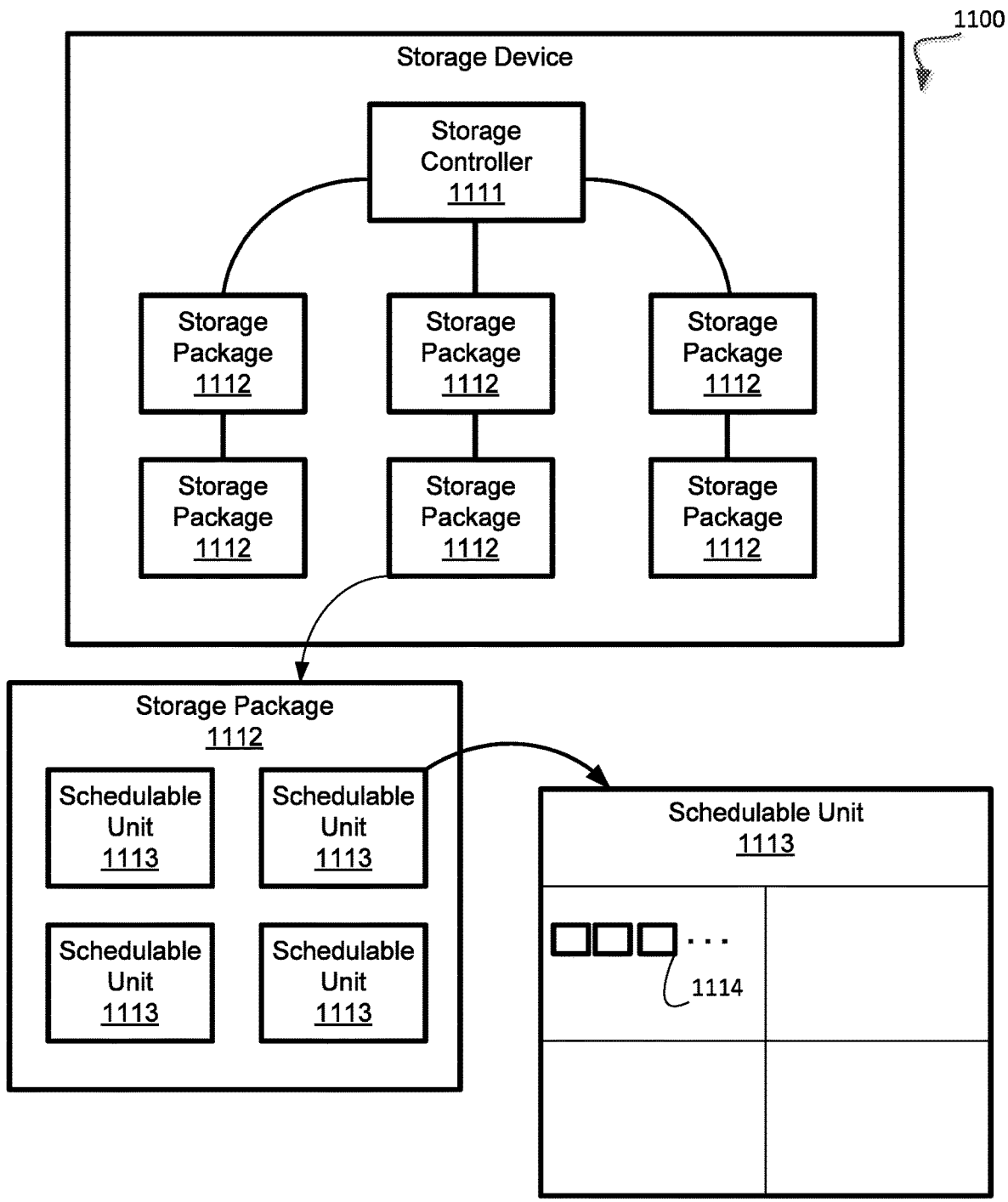
FIG. 11 illustrates an example architecture of schedulable units of a storage device in accordance with some embodiments.

FIG. 11 illustrates an example architecture 1100 of schedulable units of a storage device. In general, the architecture 1100 may correspond to a storage device that is associated with a data management component 140 or data management component 200 of FIG. 1 or 2.

As shown in FIG. 11, the architecture 1100 of the storage device may include a storage controller 1111 and multiple storage packages 1112. Each of the storage packages 1112 may include multiple schedulable units 1113 (i.e., storage dies). Furthermore, as shown, each of the schedulable units 1113 may include multiple data blocks 1114. As previously described, each of the schedulable units 113 may perform a read operation or a write operation in parallel with other schedulable units 113. Thus, an operation may be performed with or on one of the data blocks 1114 of each of the schedulable units 1113 at the same time.

Figure 12:
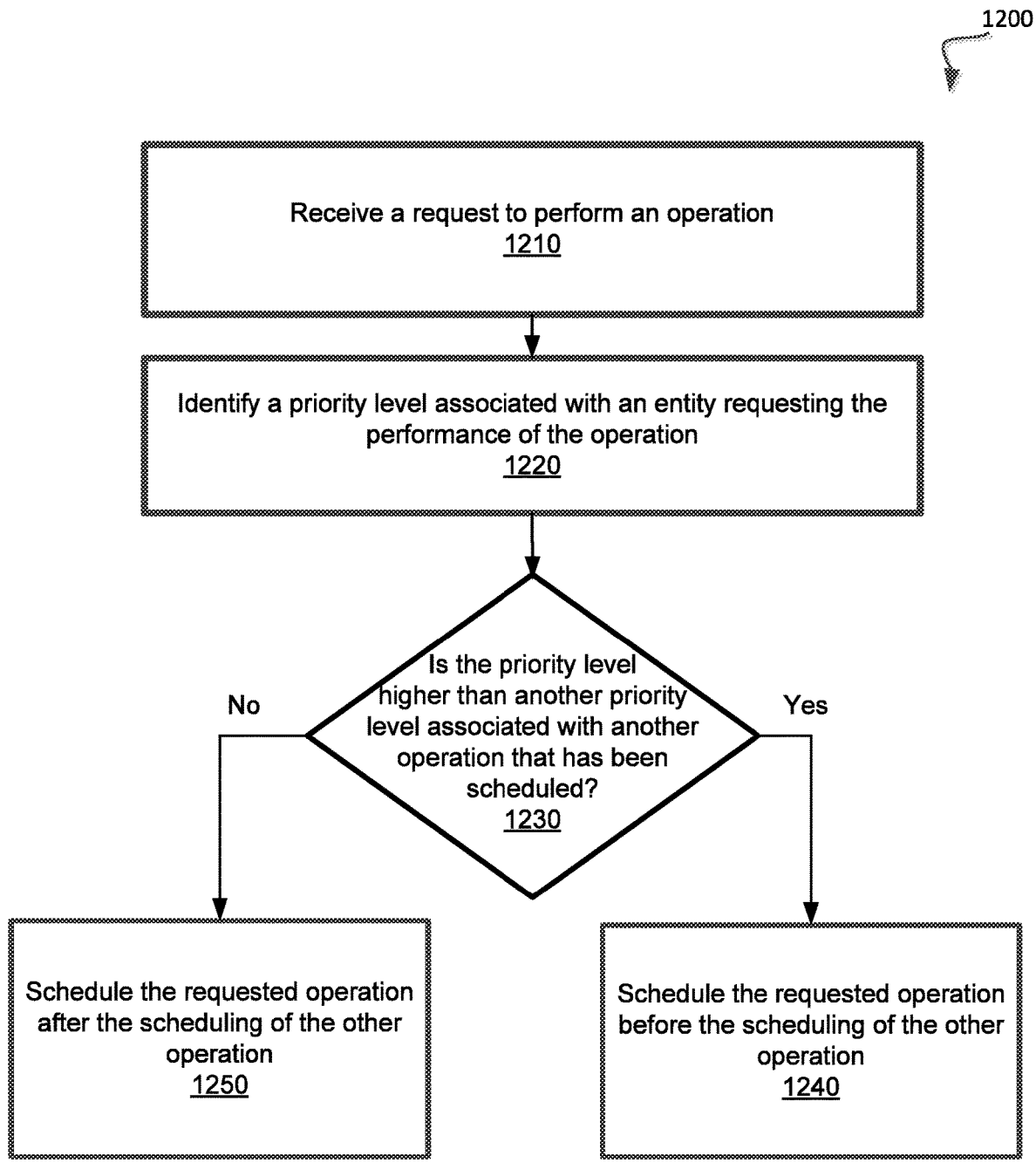
FIG. 12 is an example method to perform a requested operation based on other operations of schedulable units and characteristics of a client system or system task in accordance with some embodiments of the present disclosure.

FIG. 12 is an example method 1200 to perform a requested operation based on other operations of schedulable units and characteristics of a client system or a system task. In general, the method 1200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 1200.

As shown in FIG. 12, the method 1200 may begin with the processing logic receiving a request to perform an operation (block 1210). For example, an operating system or an application may receive a request to perform a write operation or a read operation at a storage device. The processing logic may further identify a priority level associated with an entity requesting the performance of the operation (block 1220). The entity may be a client system or a system task. For example, the system task may be a process or operation of an operating system or a host system. The client system may be associated with a user account that may specify a priority level for the client system. The priority level may specify an importance of the requested operation. The processing logic may further determine whether the priority level is higher than another priority associated with another operation that has been scheduled (block 1230). For example, a determination may be made as to whether the priority level assigned to an entity requesting the operation is higher or lower than another priority level assigned to another entity that has requested the other operation that has been scheduled. If the priority level is higher than the other priority level, then the processing logic may schedule the requested operation before the scheduling of the other operation (block 1240). For example, the requested operation may be performed at a schedulable unit before the other operation. Otherwise, if the priority level is lower than the other priority level, then the processing logic may schedule the requested operation after the scheduling of the other operation (block 1250). For example, the other operation may be performed at a schedulable unit before the requested operation.

In some embodiments, if the priority levels are the same, then the operation that is received earlier may be scheduled before a later received operation with the same priority level. In some embodiments, a requested write operation with a high priority level may be assigned to a schedulable unit that is available to perform the requested write operation sooner or earlier than another schedulable unit that is available later when compared to another write operation with a lower priority level.

Figure 13:
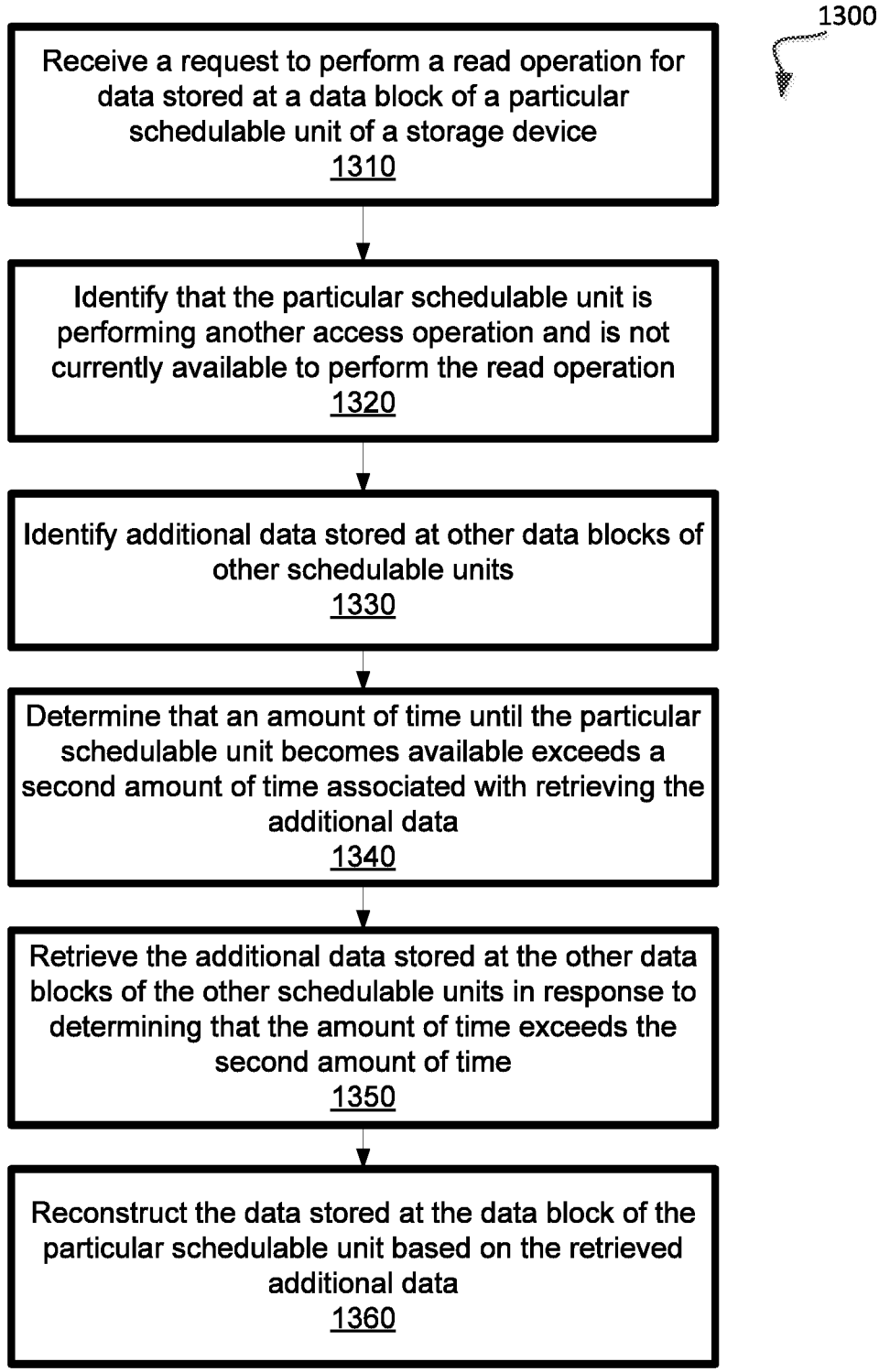
FIG. 13 is an example method to perform a read operation based on other operations of schedulable units in accordance with some embodiments.

FIG. 13 is an example method 1300 to perform a read operation based on other operations of schedulable units. In general, the method 1300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 1300.

As shown in FIG. 13, the method 1300 may begin with the processing logic receiving a request to perform a read operation for data stored at a data block of a particular schedulable unit of a storage device (block 1310). For example, the operating system or the application may receive the request to perform the read operation for the data. The processing logic may subsequently identify that the particular schedulable unit is performing another access operation (and/or is scheduled to perform additional access operations) and is not currently available to perform the read operation (block 1320). For example, the schedulable unit that includes the data block that stores the requested data may be performing a read operation or a write operation for a data block that is included in the schedulable unit. The processing logic may identify additional data stored at other data blocks of other schedulable units (block 1330). For example, different portions of data may be stored at different data blocks of different schedulable units of one or more storage devices. In some embodiments, the different data may be stored at different schedulable units at different storage devices of a storage array. Thus, the different data may be stored at multiple storage devices. Subsequently, the processing logic may determine that an amount of time until the particular schedulable unit becomes available exceeds a second amount of time associated with retrieving the additional data (block 1340). For example, other access operations that have been scheduled at the particular schedulable unit may be identified. In some embodiments, other access operations that have been scheduled at the other schedulable units may be identified to determine the second amount of time that may correspond to an amount of time to retrieve the additional data. The processing logic may subsequently retrieve the additional data stored at the other data blocks of the other schedulable units in response to determining that the amount of time exceeds the second amount of time (block 1350). For example, the particular schedulable unit may not be available to perform a read operation due to other access operations that have been scheduled. Otherwise, if the amount of time until the particular schedulable unit becomes available does not exceed the second amount of time, then the additional data may not be retrieved from the other data blocks of the other schedulable units. Instead, the read operation for the data stored at the data block of the particular schedulable unit may be scheduled.

Referring to FIG. 13, the processing logic may subsequently reconstruct the data stored at the data block of the particular schedulable unit based on the retrieved additional data (block 1360). For example, the reconstructed data may be the data that is stored at the data block of the particular schedulable unit that is not currently available and may be generated based on a combination of the additional data stored at the other schedulable units.

Figure 14:
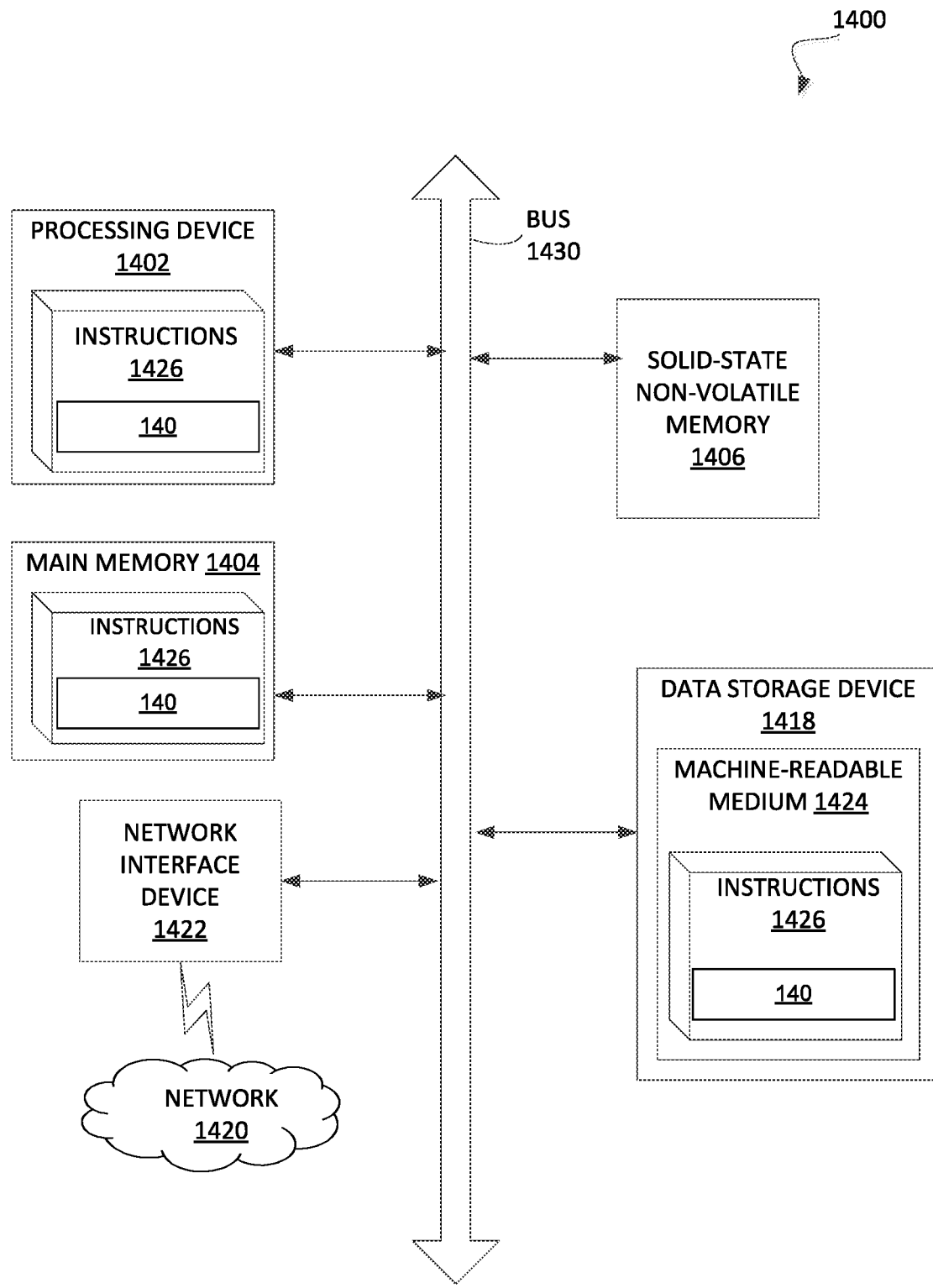
FIG. 14 is a block diagram of an example computer system operating in accordance with the disclosure described herein.

FIG. 14 depicts an example computer system 1400 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1400 includes a processing device 1402, a main memory 1404 (e.g., read-only memory (ROM), flash memory, dynamic random access memory (DRAM) such as synchronous DRAM (SDRAM)), a solid-state non-volatile memory 1406 (e.g., flash memory, 3D crosspoint (XPoint) memory, magnetoresistive random-access memory (MRAM), or any other such storage media that does not use a physical disk), and a data storage device 1416, which communicate with each other via a bus 1408.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute the data management component 140 or 200 of FIG. 1 or 2 for performing the operations and steps discussed herein. The computer system 1400 may further include a network interface device 1422. The data storage device 1416 may include a computer-readable medium 1424 on which is stored the data management component 140 or 200 of FIG. 1 or 2 embodying any one or more of the methodologies or functions described herein. The data management component 140 or 200 of FIG. 1 or 2 may also reside, completely or at least partially, within the main memory 1404 and/or within the processing device 1402 during execution thereof by the computer system 1400, the main memory 1404 and the processing device 1402 also constituting computer-readable media. The data management component 140 or 200 of FIG. 1 or 2 may further be transmitted or received over a network via the network interface device 1422.

While the computer-readable storage medium 1424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "performing," "using," "registering," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A storage system comprising:
a plurality of solid-state storage devices; and
a storage system controller, operatively coupled to and separate from the plurality of solid-state storage devices, the storage system controller comprising a processing device, the processing device configured to:
identify an entry in a data structure based on a directory, the directory indicating an organization of information in the data structure and the entry associated with a set of blocks on the plurality of solid state storage devices;
determine one or more characteristics of the set of data blocks based on the entry;
identify a first entry of the data structure and a second entry of a copy of the data structure, the first entry and the second entry associated with the set of blocks;
generate a new data structure based on the first entry, the second entry, and one or more rules; and
perform a storage operation on the set of blocks based on the one or more characteristics.

2. The storage system of claim 1, wherein the data structure is stored on a volatile memory of a solid-state storage device.

3. The storage system of claim 2, wherein the copy of the data structure is stored on a non-volatile memory of the solid state storage device.

4. The storage system claim 2, wherein the copy of the data structure is periodically updated.

5. The storage system of claim 1, wherein the entry comprises multiple portions and each portions indicates a characteristic of the set of blocks.

6. The storage system of claim 1, wherein the data structure comprises additional entries, the additional entries comprising different portions indicating different characteristics than the entry.

7. The storage system of claim 1, wherein the set of blocks are located in a first solid state storage device of the plurality of solid state storage devices and the data structure is associated with the first solid state storage device.

8. The storage system of claim 1, wherein the processing device is further configured to:
identify an additional entry in a second data structure based on a second directory, the second directory indicating a second organization of information in the second data structure and the additional entry associated with a second set of blocks on the plurality of solid state storage devices;
determine one or more characteristics of the second set of data blocks based on the additional entry; and
perform a second storage operation on the second set of blocks based on the one or more characteristics.

9. The storage system of claim 1, wherein the data structure comprises a table and wherein the entry comprises a row of the table.

10. A method comprising:
identifying an entry in a data structure based on a directory, the directory indicating and organization of information in the data structure and the entry associated with a set of blocks on a plurality of solid state storage devices;
determining one or more characteristics of the set of data blocks based on the entry;
identify a first entry of the data structure and a second entry of a copy of the data structure, the first entry and the second entry associated with the set of blocks;
generate a new data structure based on the first entry, the second entry, and one or more rules; and
performing a storage operation on the set of blocks based on the one or more characteristics.

11. The method of claim 10, wherein the data structure is stored on a volatile memory of a solid-state storage device.

12. The method of claim 11, wherein a copy of the data structure is stored on a non-volatile memory of the solid state storage device.

13. The method claim 11, wherein the copy of the data structure is periodically updated.

14. The method of claim 10, wherein the entry comprises multiple portions and each portions indicates a characteristic of the set of blocks.

15. The method of claim 10, wherein the data structure comprises additional entries, the additional entries comprising different portions indicating different characteristics than the entry.

16. The method of claim 10, wherein the set of blocks are located in a first solid state storage device of the plurality of solid state storage devices and the data structure is associated with the first solid state storage device.

17. The method of claim 10, further comprising:
identifying an additional entry in a second data structure based on a second directory, the second directory indicating a second organization of information in the second data structure and the additional entry associated with a second set of blocks on the plurality of solid state storage devices;
determining one or more characteristics of the second set of data blocks based on the additional entry; and
performing a second storage operation on the second set of blocks based on the one or more characteristics.

18. A non-transitory computer readable storage medium storing instructions, which when executed, cause a processing device of a storage system controller to:
identify an entry in a data structure based on a directory, the directory indicating and organization of information in the data structure and the entry associated with a set of blocks on a plurality of solid state storage devices;
determine one or more characteristics of the set of data blocks based on the entry;
identify a first entry of the data structure and a second entry of a copy of the data structure, the first entry and the second entry associated with the set of blocks;
generate a new data structure based on the first entry, the second entry, and one or more rules; and perform a storage operation on the set of blocks based on the one or more characteristics.

* * * * *